(12) United States Patent
Tomita et al.

(10) Patent No.: US 6,778,473 B1
(45) Date of Patent: Aug. 17, 2004

(54) OPTICAL DISK RECORDING AND/OR REPRODUCING APPARATUS AND ACCESS METHOD

(75) Inventors: Nobuyoshi Tomita, Tokyo (JP); Shinji Katsuki, Tokyo (JP); Hiroshi Saitoh, Saitama (JP); Takahiro Kusuyama, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/600,205

(22) PCT Filed: Nov. 15, 1999

(86) PCT No.: PCT/JP99/06366

§ 371 (c)(1),
(2), (4) Date: Aug. 17, 2000

(87) PCT Pub. No.: WO00/30083

PCT Pub. Date: May 25, 2000

(30) Foreign Application Priority Data

Nov. 17, 1998 (JP) .......................................... P10-327017

(51) Int. Cl.[7] ................................................ G11B 7/00
(52) U.S. Cl. ............................... 369/44.26; 369/44.34; 369/44.41
(58) Field of Search .......................... 369/44.26, 44.29, 369/44.28, 44.34, 44.24, 44.35, 53.27, 53.28, 53.31, 275.4, 44.41

(56) References Cited

U.S. PATENT DOCUMENTS

| | | | | |
|---|---|---|---|---|
| 5,732,060 A | * | 3/1998 | Toyota et al. .......... | 369/112.14 |
| 5,875,157 A | * | 2/1999 | Sasaki et al. ............ | 369/44.29 |
| 5,903,529 A | * | 5/1999 | Nishi et al. .............. | 369/44.23 |
| 6,044,050 A | * | 3/2000 | Kuroiwa ................... | 369/44.41 |
| 6,169,715 B1 | * | 1/2001 | Nakamura et al. ....... | 369/44.32 |
| 6,192,009 B1 | * | 2/2001 | Kim ........................ | 369/44.25 |
| 6,233,208 B1 | * | 5/2001 | Sasaki ..................... | 369/44.29 |
| 6,314,063 B1 | * | 11/2001 | Nemoto ................... | 369/44.12 |
| 6,400,662 B1 | * | 6/2002 | Choi et al. ............... | 369/44.28 |

FOREIGN PATENT DOCUMENTS

| | | | | |
|---|---|---|---|---|
| JP | 60-214429 | 10/1985 | ........... | G11B/7/09 |
| JP | 7-29188 | 1/1995 | ........... | G11B/7/09 |
| JP | 10-283643 | 10/1998 | ........... | G11B/7/085 |
| JP | 11-175983 | 7/1999 | ........... | G11B/7/09 |
| JP | 2000-20973 | 1/2000 | ........... | G11B/7/09 |

* cited by examiner

Primary Examiner—Thang V. Tran
Assistant Examiner—Bach Vuong
(74) Attorney, Agent, or Firm—Oblon, Spivak, McClelland, Maier & Neustadt, P.C.

(57) ABSTRACT

A recording and/or reproducing apparatus for an optical disc having a pit area where data has been recorded and also having a grooved area where data is to be recorded includes an optical pickup, an error signal generating unit, a shift signal generating unit and a servo controller. The optical pickup includes an objective lens for converging a light beam on a signal surface of the optical disc, a photodetector for receiving the light beam reflected from the signal surface and an actuator for moving the objective lens in a direction perpendicular to its optical axis. The shift signal generating unit is responsive to the output signal of the photodetector to generate a lens shift signal corresponding to the amount of shift of the objective lens from its neutral position. The servo controller drives the actuator based on the lens shift signal or the error signal to move the objective lens along the radial direction of the optical disc.

26 Claims, 17 Drawing Sheets

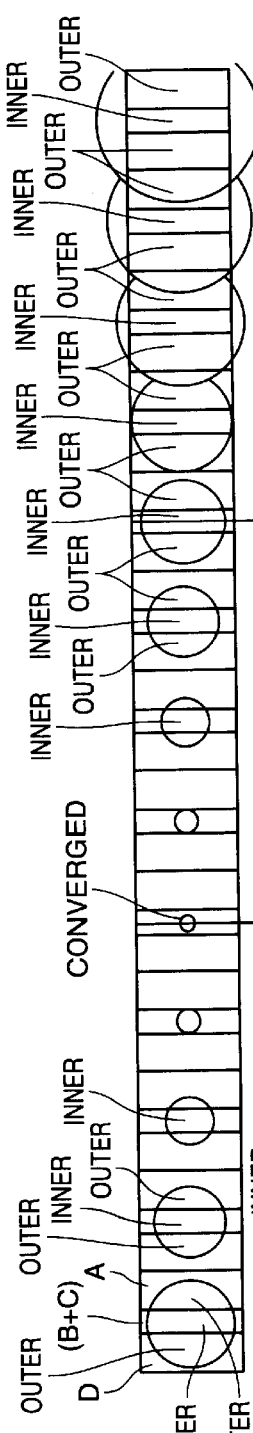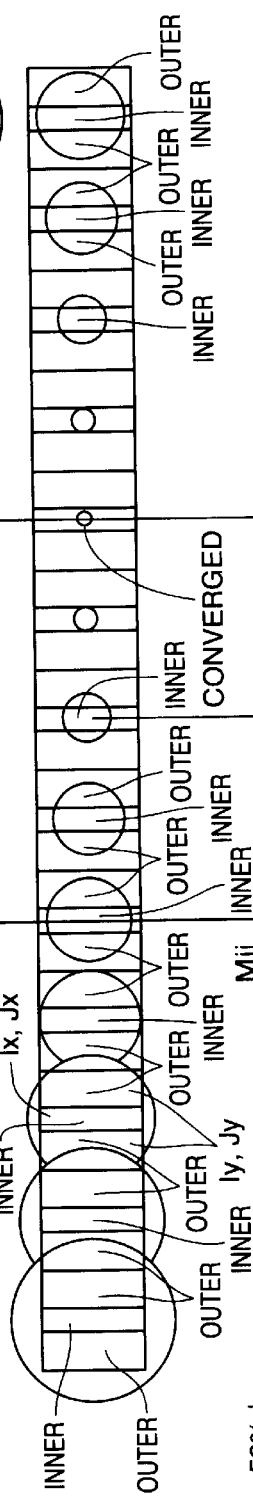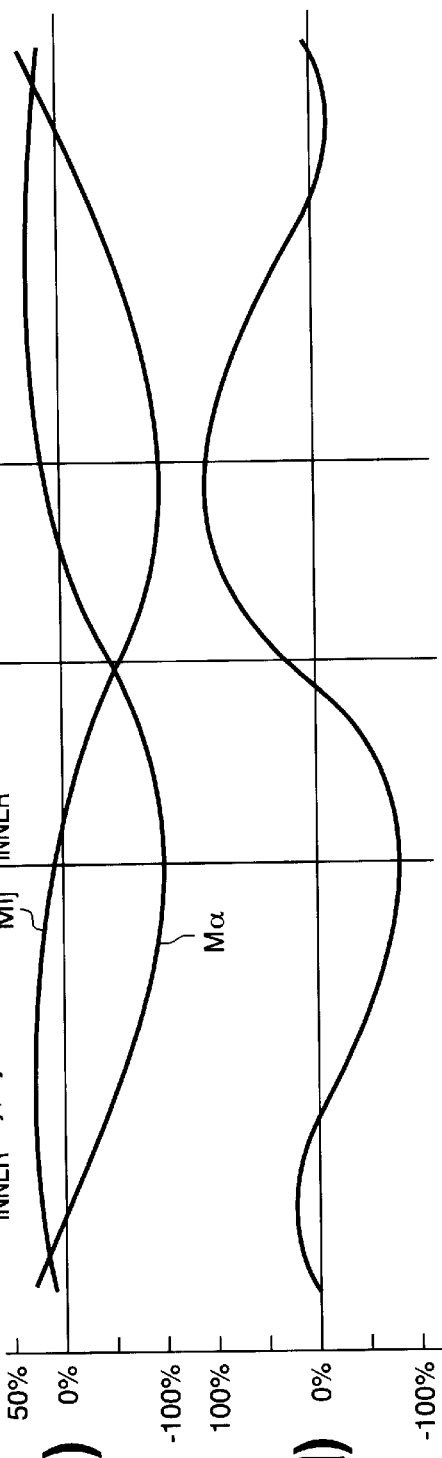
FIG.5(a)
FIG.5(b)
FIG.5(c)
FIG.5(d)

AMOUNT OF SLED MOVEMENT S
< RANGE OF POSSIBLE LENS SHIFT L

RANGE OF POSSIBLE LENS SHIFT L
< AMOUNT OF SLED MOVEMENT S
< RANGE OF POSSIBLE TRACK JUMP T

RANGE OF POSSIBLE TRACK JUMP T
< AMOUNT OF SLED MOVEMENT S

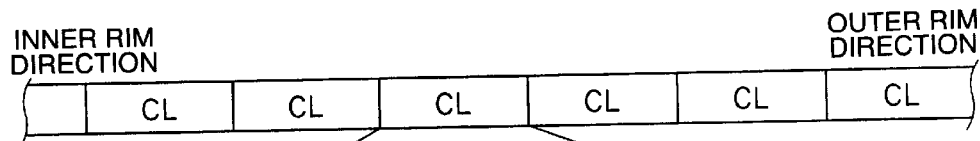
FIG.17(a)
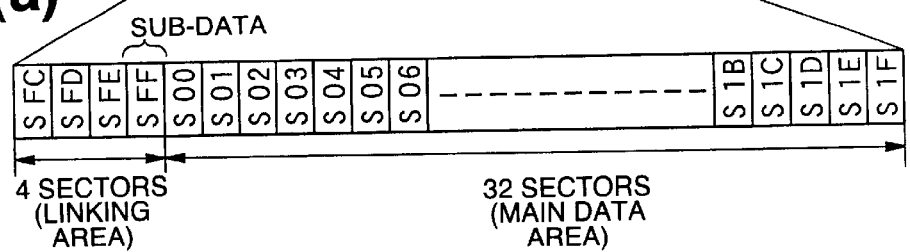
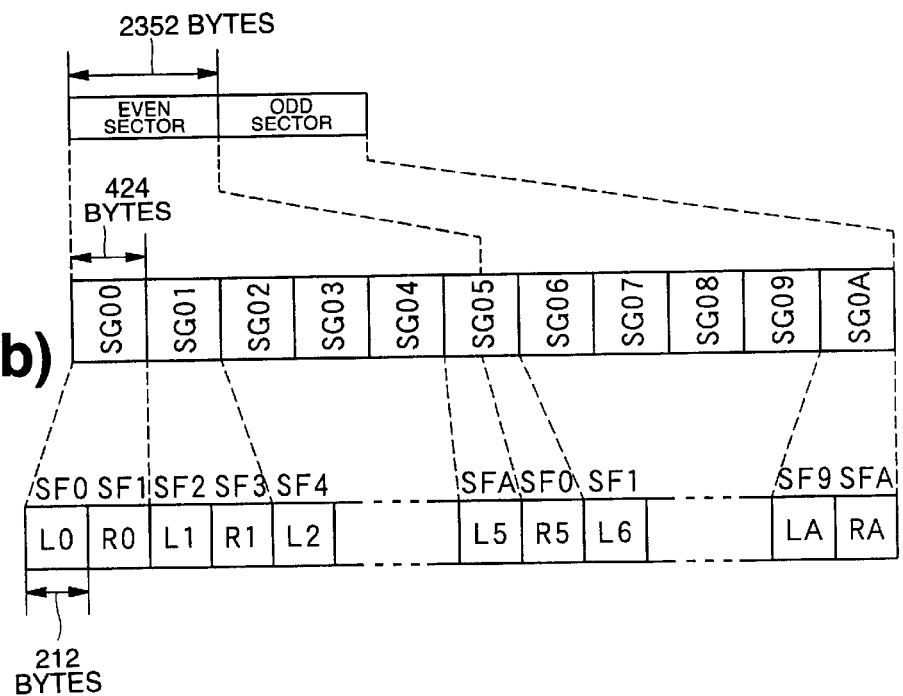
FIG.17(b)

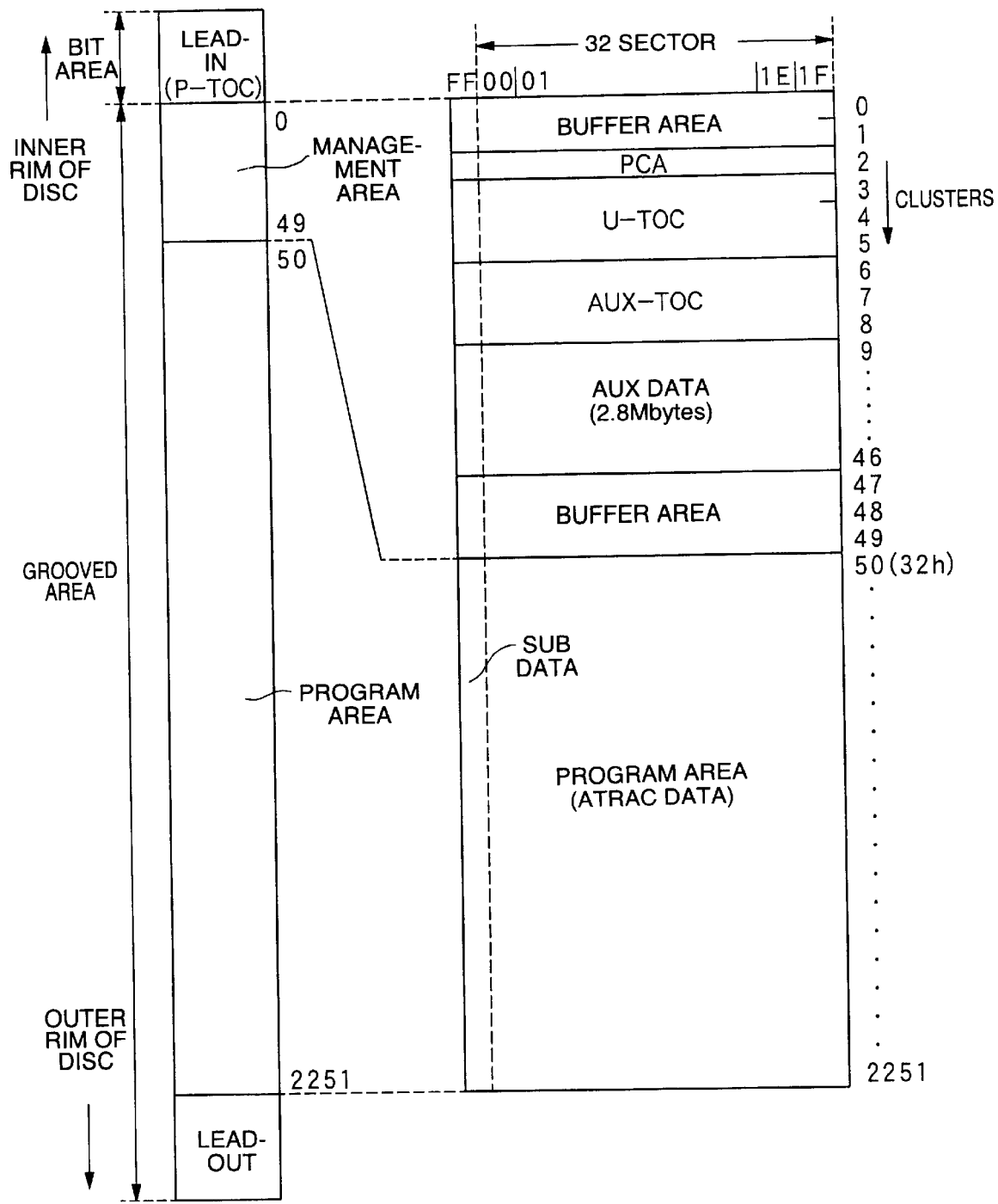
FIG.18(a)     FIG.18(b)

OPTICAL DISK RECORDING AND/OR REPRODUCING APPARATUS AND ACCESS METHOD

TECHNICAL FIELD

This invention relates to a recording and/or reproducing apparatus for an optical disc and an accessing method therefor. More particularly, it relates to a recording and/or reproducing apparatus for an optical disc employing lens shift signals, and an accessing method therefor.

BACKGROUND ART

Heretofore, an optical disc, such as a so-called CD (Compact Disc) or a MD (Mini-Disc), has been used as an optical recording medium for variable information signals, such as audio information.

A recording and/or reproducing apparatus for recording information signals on an optical disc or reproducing information signals recorded on the optical disc is configured for converging a light beam radiated from a laser light source provided on an optical pickup on a signal recording surface of the disc. The recording and/or reproducing apparatus generates tracking error signals, indicating the relative position of a track on the signal recording surface with respect to a light spot of a light beam, based on a light beam reflected from the signal recording surface of the disc, to perform tracking servo control for causing the light spot of the light beam to trace the tack optimally based on the tracking error signals.

To this end, the recording and/or reproducing apparatus includes an actuator and a sled mechanism for causing radial movement of the entire optical pickup along the radius of the disc. The actuator operates for converging the light beam from the laser light source with respect to the signal recording surface of the disc or causing the movement of an objective lens in the focussing direction, that is in a direction towards and away from the disc to permit the light spot of the laser light to optimally trace the track.

Meanwhile, among the recording and/or reproducing apparatus for recording information signals on an optical disc, such as a CD or an MD, or reproducing the information signals recorded on the optical disc, there is a portable type apparatus, in addition to a desk type apparatus. In the portable apparatus, the attitude of the apparatus itself is changed omnidirectionally under variable using conditions. Thus, in the portable recording and/or reproducing apparatus, the objective lens in an optical pickup is shifted from a mid-point position or neutral position, along the focussing direction and along the tracking direction, under the effect of the force of gravity, depending on the attitude of the apparatus.

Thus, in a conventional portable recording and/or reproducing apparatus, the block of the optical system needs to be designed so that, even if the objective lens is offset from the neutral position, recording and/or reproducing will be performed as normally. For example, if the position shifting of the objective lens along the tracking direction (radial direction of the disc) is taken into account, sufficient tolerance is afforded to the range of possible lens movement in the actuator adapted to drive the objective lens along the radius of the disc, in order that the optimum recording and/or reproducing operation will be initiated even if the objective lens is shifted from the mid-point position due to, for example, the force of gravity. The result is that the conventional recording and/or reproducing apparatus suffers from the problem that the structure of the optical block or the block of the electrical circuit controlling the optical block tends to be in size and/or in complexity.

Also, in the recording and/or reproducing apparatus for an MD, in which data is recorded on the disc in accordance with a photomagnetic system, a magnetic head needs to be mounted facing the laser illuminating position of the objective lens with the disc in-between. The result that, if the sufficient allowance is accorded to the range of lens movement along the radius of the disc, the structure of the magnetic head itself is also increased in size.

DISCLOSURE OF THE INVENTION

In view of the above problem, it is an object of the present invention to provide a disc drive device that is able to make recording and/or reproduction optimally under any attitude states.

It is another object of the present invention to reduce the size of e.g., an optical system in an optical pickup.

The present invention provides a recording and/or reproducing apparatus for an optical disc on which data have been recorded spirally or toroidally and address data are also recorded and which includes a pit area having the above data recorded as pits and a grooved area having a groove for recording the data. The apparatus includes an optical pickup, an error signal generating circuit, a shift signal generating unit and a servo controller. The optical pickup includes a light source for illuminating a light beam on the optical disc, an objective lens for converging a light beam radiated from the light source on the optical disc, a photodetector for receiving the light beam converged by the objective lens and reflected from the signal surface of the optical disc, and an actuator for moving the objective lens in a radial direction of the optical disc perpendicular to the optical axis of the objective lens. The photodetector has first to fourth photodetector segments split by boundary lines running parallel to the tracks of the optical disc. The error signal generating unit generates an error signal for moving the objective lens in the radial direction of the optical disc perpendicular to the optical axis of the optical disc, based on the amount of shift in the radial direction of the optical disc of the light beam converged by the objective lens on the signal surface of the optical disc to scan the track on the optical disc, based on output signals of the first to fourth photodetector segments. The shift signal generating unit generates a lens shift signal corresponding to the amount of shift from a neutral position of the objective lens, based on output signals of the first to fourth photodetector segments. The servo controller drives the actuator, based on at least one of the lens shift signal generated by the lens shift signal generating circuit and the error signal generated by the error signal generating unit, for moving the objective lens in the radial direction of the optical disc perpendicular to the optical axis of the objective lens.

The objective lens is set to a neutral position, by being moved based on the lens shift signal, and the tracking control can be made based on the error signal obtained based on the amount of deviation along the radial direction of the optical disc of the light beam from the neutral position, so that it is possible to realize the tracking control with stable high reliability.

The present invention also provides a recording and/or reproducing apparatus for an optical disc on which there are recorded data spirally or toroidally and on which there are also recorded address data. The apparatus includes an optical pickup, an error signal generating circuit, a shift signal generating unit and a servo controller, similar to those of the above-defined apparatus.

The present invention also provides a recording and/or reproducing apparatus for an optical disc on which data have been recorded by pits spirally or toroidally, and on which are also recorded address data. The apparatus includes an optical pickup, an error signal generating circuit, a shift signal generating unit, a servo unit and an optical pickup. The optical pickup includes alight source for illuminating a light beam on the optical disc, an objective lens for converging the light beam radiated from the light source on a signal surface of the optical disc, a photodetector for receiving the light beam reflected from a signal surface of the optical disc, a photodetector for receiving the light beam converged by the objective lens and reflected from the signal surface of the optical disc, and an actuator for moving the objective lens in a radial direction of the optical disc perpendicular to the optical axis of the objective lens. The photodetector has first to fourth photodetector segments split by boundary lines running parallel to the tracks of the optical disc. The error signal generating unit generates an error signal for moving the objective lens in the radial direction of the optical disc perpendicular to the optical axis of the optical disc, based on the amount of shift in the radial direction of the optical disc of the light beam converged by the objective lens on the signal surface of the optical disc to scan the track on the optical disc, based on output signals of the first to fourth photodetector segments. The shift signal generating unit generates a lens shift signal corresponding to the amount of shift from a neutral position of the objective lens, based on output signals of the first to fourth photodetector segments. The servo controller drives the actuator, based on at least one of the lens shift signal generated by the lens shift signal generating circuit and the error signal generated by the error signal generating unit, for moving the objective lens in the radial direction of the optical disc perpendicular to the optical axis of the objective lens. The controller controls the operation of the servo unit, while driving the movement mechanism based on the current position of the objective lens, the distance to the movement target position of the objective lens and on the lens shift signal outputted by the shift signal generating unit.

The controller finds the amount of the lens shift signal Ls based on the lens shift signal from the shift signal generating unit, and calculates the number of track jumps J based on the current position of the objective lens and the distance to the movement target position to the objective lens to calculate the amount of movement of the optical pickup by the movement mechanism based on the following relationship:

$$S = Ls + J.$$

The present invention provides an accessing method in a recording and/or reproducing apparatus for an optical disc on which there are recorded data spirally or toroidally and on which there are also recorded address data. The accessing method includes the steps of converging a light beam radiated from a light source by an objective lens on a signal surface of the optical disc, receiving the light beam converged by the objective lens and reflected from the signal surface of the optical disc by a photodetector having first to fourth photodetector segments split by boundary lines running parallel to the track of the optical disc, generating an error signal for moving the objective lens along the radial direction of the optical disc perpendicular to the optical axis of the objective lens based on an amount of shift along the radial direction of the optical disc of the light beam converged by the objective lens on the signal surface of the optical disc to scan the track of the optical disc, based on output signals of the first to fourth photodetector segments, generating a lens shift signal corresponding to the amount of shift from the neutral position of the objective lens based on the output signals of the first to fourth photodetector segments, and moving the objective lens along the radial direction of the optical disc perpendicular to the optical axis of the objective lens based on at least one of the lens shift signal and the error signals generated, while moving the optical pickup along the radial direction of the optical disc perpendicular to the optical axis of the objective lens, based on the current position of the objective lens, distance to the movement target position of the objective lens and on the lens shift signal, to control the position of the light beam relative to the track of the light beam.

Other objects and advantages of the present invention will become apparent from the following description which is made with reference to the accompanying drawings.

BRIEF DESCRIPTION OF THE DRAWINGS

FIGS. 5($a$) to 5($d$) illustrate focussing error signals in the recording and/or reproducing apparatus according to the present invention.

FIGS. 17(a) and 17(b) illustrate a disc sector format.

FIGS. 18(a) and 18(b) illustrate a disc area structure.

BEST MODE FOR CARRYING OUT THE INVENTION

In the following, a preferred embodiment of the present invention will be explained in detail.

In the illustrated embodiment, the present invention is applied to a recording and/or reproducing apparatus for a magneto-optical disc employing the magneto-optical disc as a recording medium.

Figure 1:
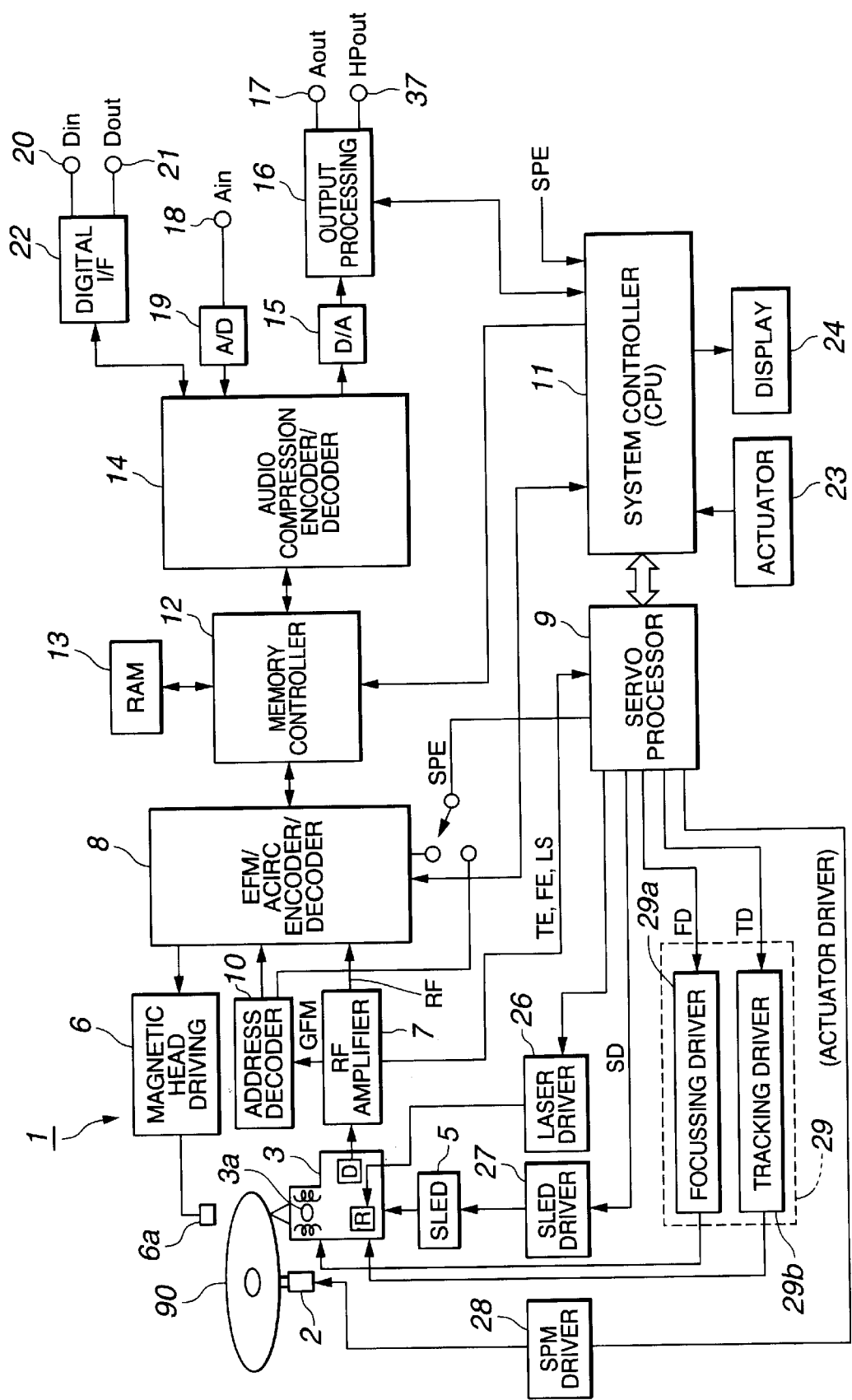
FIG. 1 is a block diagram of a recording and/or reproducing apparatus according to the present invention.

A recording and/or reproducing apparatus 1 for a magneto-optical disc includes a spindle motor 2 for rotationally driving a magneto-optical disc 90 for recording audio data and an optical pickup 3 for converging a light beam on a magneto-optical disc 90 run in rotation by the spindle motor 2, as shown in FIG. 1.

The optical pickup 3 outputs the laser light to a high level for heating the recording track to a Curie temperature during recording, while outputting the laser light the laser light to a low level for detecting data from the reflected light by the magnetic Kerr effect during playback. To this end, the optical pickup 3 includes an optical system comprised of a laser diode, as a light source as later explained, an optical prism, a light emitting device, such as a photodetector, for detecting the reflected light from a signal recording surface of the disc 90, and an objective lens 3a. The objective lens 3a, provided on the optical pickup 3, is supported by an actuator 4 for displacement in a radial direction of the disc and in a direction towards and away from the disc. The actuator 4 is provided with a tracking coil for driving the objective lens 3a along the radius of the disc and a focussing coil for causing the movement of the objective lens 3a into contact with and away from the disc.

At a position facing the objective lens 3a of the optical pickup 3, with the disc 90 in-between, there is provided a magnetic head 6a for applying a perpendicular magnetic field modulated by data supplied to the magnetic head 6a to the magneto-optical disc 90.

The optical pickup 3 in its entirety and the magnetic head 6a are moved by a sled mechanism 5 along the radius of the disc. The sled mechanism 5 is a mechanism for causing the movement of the optical pickup 3 in its entirety along the radius of the optical disc and includes a sled motor in its interior for sliding the optical pickup 3.

An RF amplifier 7 includes a current-voltage conversion circuit, an amplifier circuit and a matrix processing circuit (RF matrix amplifier) and, during playback, generates or extracts pull-in signals PI, playback RF signals, tracking error signals THE, focussing error signals FE, groove information GFM (absolute position information recorded as the pre-groove wobbled along the radial direction of the disc 9) and lens shift signal LS (lens position signal), by the calculation processing of the information detected by the optical pickup 3 from the disc 90. The playback RF signals generated by the RF amplifier 7 are routed to an encoder/decoder unit 8. The tracking error signals THE and the focussing error signals FE, extracted by the RF amplifier 7, are sent to a servo processor 9, whilst the groove information GFM, extracted by the RF amplifier 7, is routed to an address decoder 10.

The servo processor 9 generates various servo driving signals, based on tracking error signals THE or focussing error signals FE from the RF amplifier 7, track jump commands and accessing commands from a system controller 11, constituted by a micro-computer and on spindle error signals obtained from the rotational speed detection information SPE from the spindle motor 2. The supporting member 9 is responsive to the focussing error signals FE and the tracking error signals THE from the RF amplifier 7 to generate focussing drive signals FD and tracking drive signals TD to route the generated signals to an actuator driver 29. This actuator driver 29 includes e.g., a focussing driver 29a and a tracking driver 29b. The focussing driver 29a routes the driving current, generated based on the focussing drive signals FD, to a focussing coil of the actuator 4 to drive the objective lens 3a in a direction into contact with or away from the disc surface. The tracking driver 29b sends the driving current, generated based on the tracking drive signals TD, to the tracking coil of the actuator 4 to drive the objective lens 3a along the radius of the disc. This constitutes a focussing servo loop comprised of the optical pickup 3, RF amplifier 7, servo processor 9 and the actuator driver 29.

As for the tracking servo control, the tracking servo control on state, which is the state of tracking servo being executed, means a state in which the objective lens 3a is driving-controlled by the actuator 4 so that the light spot of the laser light beam will correctly trace the track based on the tracking error signals THE. Conversely, the tracking servo off state, which is the state of tracking servo not being engaged, means a state in which the driving control of the objective lens 3a by the actuator based on the tracking error signals is not being executed.

The servo processor 9 routes spindle drive signals, generated from the spindle error signals SPE, to a spindle motor driver 28. The spindle motor driver 28 is responsive to this spindle motor drive signal to apply e.g., three-phase driving signals to the spindle motor 2 at a constant linear velocity (CLV). The servo processor 9 is responsive to a spindle kick (acceleration) or braking (deceleration) signal, routed from the system controller 11, to execute operations such as startup or stop of the spindle motor 2 by the spindle motor driver 28. The servo processor 9 generates a sled drive signal SD, based on the lens shift signal, tracking error signals THE and an accessing command from the system controller 11 as later explained, to route the generate signal to a sled driver 27. The sled driver 27 is responsive to the sled drive signal SD to drive the sled mechanism 5.

The sled mechanism 5 is a mechanism for causing movement of the entire optical pickup 3 and the magnetic head 6a along the radial direction of the disc 90 and is responsive to the sled drive signal SD to drive the sled motor of the sled mechanism 5 to effect optimum movement of the optical pickup 3.

The servo processor 9 executes light emission driving control of the laser diode of the optical pickup 3. The laser diode of the optical pickup 3 has its light emission driving controlled by a laser driver 26, such that the servo processor 9 generates laser driving signals which will give a pre-set output level necessary for recording and/or reproduction of the laser output during the recording and/or reproducing operation, based on the command from the system controller 11, to route the generated laser drive signal to the laser driver 26. The laser driver 26 light-emission-controls the laser diode of the optical pickup 3 so that the corresponding light emission level will be achieved.

The address decoder 10 decodes the groove information GFM supplied thereto to extract the address information therefrom. This address information is routed to the system controller 11 so as to be used for a variety of control operations. The playback RF signals are decoded, such as by EFM demodulation or CIRC, in the encoder/decoder unit 8. At this time, address data, sub-code data etc are also extracted and routed to the system controller 11.

The speech data (sector data), decoded with e.g., EFM modulation or CIRC in the encoder/decoder unit 8, are transiently written by a memory controller 12, in a buffer memory 13 constituted by a D-RAM (dynamic random access memory). Data read-out by the optical pickup 3 from the disc 90 and transfer of playback data in the system from the optical pickup 3 to the buffer memory 13 occur at 1.41 Mbit/sec and usually the readout from the disc 90 and the writing in the memory 13 occur intermittently.

The data written in the buffer memory 13 is read out at a timing corresponding to the transfer of playback data of 0.3 Mbit/sec and routed to an encoder/decoder unit 14. The data sent to the encoder/decoder unit 14 is reproduced by decoding as a counterpart of the speech compressing processing at the time of recording sent to the encoder/decoder unit 14 so as to be converted into digital audio signals at a 44.1 kHz sampling and 16-bit quantization. The digital audio signal outputted from the encoder/decoder unit 14 is converted by a D/A converter 15 to analog signals which then are processed in an output processing unit 16 with level adjustment and impedance adjustment so as to be outputted as an analog audio signal Aout from a line output terminal 17. The analog audio signals from the D/A converter 15 is sent as headphone output HPout to a headphone output terminal 37 so as to be supplied to a headphone, not shown, which is in circuit.

The digital audio signals, decoded by the encoder/decoder unit 14, can be sent to a digital interfacing unit 22, so as to be outputted from a digital output terminal 21 as digital audio signal Dout to an external equipment and so as to be outputted to the external equipment by e.g., optical cable transmission.

When performing the recording operation on the disc 90, recording signals supplied to a line input terminal 18 (analog audio signal Ain) is converted by an A/D converter 19 into digital signals, which then are routed to the encoder/decoder 14 where the signals are processed with audio compression encoding.

If digital audio signals Din are routed to a digital input terminal 20 from an external equipment, control codes etc are extracted in the digital interfacing unit 22. The audio data are routed to the encoder/decoder 14 so as to be processed with audio compression encoding. Although not shown, it is possible to provide a microphone input terminal to use a microphone input as recording signal.

The recording data compressed by the encoder/decoder 14 is transiently written in the buffer memory 13 by the memory controller 12 for storage and is subsequently read out every data unit of a pre-set data volume so as to be thence routed to the encoder/decoder unit 8. The recording data then is encoded n the encoder/decoder unit 8 with e.g., CIRC encoding or EFM modulation and subsequently routed to a magnetic head driving circuit 6.

The magnetic head driving circuit 6 is responsive to the encoded recording data to send magnetic head driving signals to the magnetic head 6a. That is, the magnetic head driving circuit 6 causes the magnetic head 6a to apply a perpendicular magnetic field of N or S on the disc 90. At this time, the system controller 11 sends a laser control signal to cause the servo processor 9 to output a light beam of the recording level. This permits the servo processor 9 to perform control through the laser driver 26 so that the light emitting output of the laser diode of the optical pickup 3 will be a high-level laser output for recording.

An operating unit 23 denotes a portion acted on by a user and includes a set of actuators such as a variety of operating keys and dials. The actuators may be enumerated by, for example, those for recording and/or reproducing operations, such as reproduction, recording, pause, stop, fast feed (FF), rewind (REW) or locating search (AMS), and those for the play mode, such as normal reproduction, program reproduction or random reproduction. The operating information corresponding to the operating keys or dials acted on by the user is routed to the system controller 11 which then executes the operational control corresponding to the operating information.

The display operation on a display unit 24 is controlled by the system controller 11 so that data to be demonstrated in executing the display operation is transmitted to a display driver in the display unit 24. The display driver in the display unit 24 actuates the display operation on the display, such as a liquid crystal panel, constituting the display unit 24, based on data supplied thereto, to demonstrate the numerals, letters or symbols as appropriate. This demonstrates the operating mode state of the disc being reproduced, track number, recording/ reproducing time or the editing state.

A disc structure of the magneto-optical disc 90 employed in the recording and/or reproducing apparatus 1 for the magneto-optical disc is hereinafter explained. Before proceeding to the description of the magneto-optical disc 90, data units, namely a sector and a cluster, and an area structure thereof, are first explained.

A recording track of the magneto-optical disc 90 is a concatenation of clusters CL, as shown in FIG. 17(a). Each cluster, corresponding to two to three turns or tracks, represents a minimum unit in recording. Each sector CL is made up of a linking area of four sectors SFC to SFF and a main data area of 32 sectors from sector S00 to sector S1F. Each sector is a data unit made up of 2352 bytes. In the 4-sector sub-data area, the sector SFF is a sub-data sector used for recording the information as sub-data, however, the three sectors of sector SFC to sector SFE cannot be used for data recording.

On the other hand, TOC (table-of-contents)data, audio data or AUX data are recorded in a 32-sector main data area. Meanwhile, an address is recorded from sector to sector.

Each sector is sub-divided into units, termed sound groups, with two sectors being divided into 11 sound groups, as shown in FIG. 17(b). Specifically, the sectors are configured so that sound groups SG00 to SG0A are contained in two consecutive sectors of an even sector such as sector S00 and an odd sector such as sector S01. Each sound group is made up of 424 bytes and is of an audio data volume corresponding to 11.61 msec. In each sound group SG, data are recorded in two channels of L and R channels. For example, the sound group SG00 is made up of an L-channel data L0 and R-channel data R0, whilst the sound group SG01 is made up of an L-channel data L1 and R-channel data R1.

212 bytes, which prove L-channel or R-channel data areas, are termed a sound frame.

An area structure of a magneto-optical disc 90 is as shown in FIGS. 18(a) and 18(b). FIG. 18(a) shows an area from the radially innermost side to the radially outermost side of the disc.

The magneto-optical disc 90 has, in its radially innermost area, a pit area having recorded thereon replay-only data by embossed pits. In this pit area, there are recorded P-TOC (pre-recorded TOC) data. An area outside of the pit area is a groove area as an area which permits recording and/or reproduction and in which there is formed a groove wobbled in the radial direction of the disc 90 as a recording track guide groove, as explained previously. A domain from cluster 0 to cluster 49, on the radially innermost side of the grooved area, is a management area. It is in the program area from cluster 50 to cluster 2252 that a program, such as musical numbers, are recorded, whilst an area radially outside of the program area operates as a lead-out area.

FIG. 18(b) shows the inside of the management area in more detail. FIG. 18(b) shows sectors and clusters in the horizontal and vertical directions, respectively.

In the management area, the clusters 0, 1 represent buffer areas with respect to the pit area. The cluster 2 is a power calibration area used for adjusting the output power of the light beam.

In the clusters 3 to 5 are recorded U-TOC (user's TOC) data. In the U-TOC, the data format is prescribed in each sector in one cluster, and pre-set respective management information is recorded. A cluster having sectors proving the U-TOC data is recorded on end thrice as the clusters 3 to 5.

In the clusters 6 to 8 are recorded AUX-TOC (auxiliary TOC) data. In the AUX-TOC, the data format is prescribed in each sector in one cluster, and the pre-set respective management information is recorded. A cluster having sectors proving the AUC-TOC data is recorded on end thrice as the clusters 6 to 8.

An area from cluster 9 to cluster 46 is an area in which to record the AUX data. A data file as the AUX data is formed on the sector basis and picture file sectors, as a still image file, are formed.

The data file as the AUX data or an area in the AUX data area in which the AUX data file can be recorded is managed by the AUX-TOC.

The recording capacity of the data file in the AUX data area is 2.8 Mbytes if the error correction system mode 2 is taken into account.

It may also be contemplated to form a second AUX data area in the latter half portion of the program area or in an area radially outside of the program area, such as a lead-out area.

The clusters 47 to 49 represent a buffer area with respect to the program area.

In the program area downstream of the cluster 50 (=32 h), there are recorded audio data, such as one or more musical numbers, in a pre-set compressed form.

The respective recorded programs or recordable areas are managed by U-TOC data recorded in the U-TOC.

In this recording and/or reproducing apparatus, a replay-only disc, having recorded thereon programs etc as read-only data in pit configuration, may also be used. In this replay-only disc, the entire area on the disc represents a pit area. The programs recorded on the disc is managed by the P-TOC data recorded in the P-TOC in much the same way as the U-TOC, which is not provided in this case.

If the replay only data file is to be recorded as the AUX data, the AUX-TOC data is recorded in the AUX-TOC used for managing the AUX data.

In light of the foregoing explanation, the grooved structure of the magneto-optical disc 90 is now explained with reference to FIGS. 19(a) and 19(b).

Figure 19A:
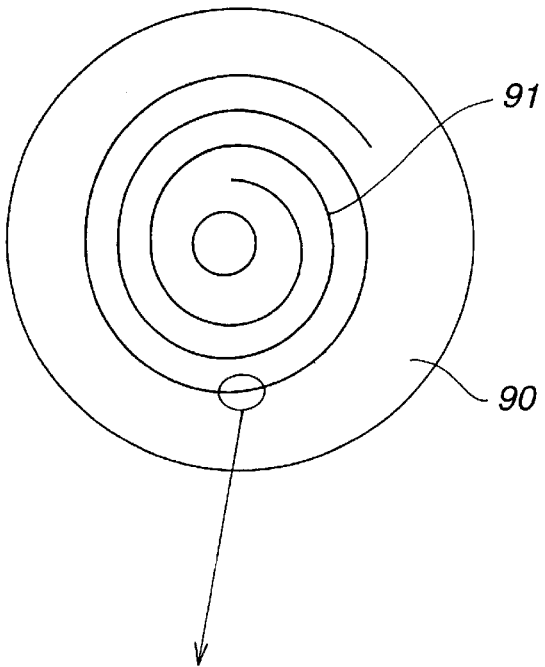
FIGS. 19(a) and 19(b) illustrate the structure of a disc groove area.

As schematically shown in FIG. 19(a), there is spirally formed from the outset in the grooved area of the disc 90 a pre-groove 91 extending from the radially inner side to the radially outer side of the disc. Of course, the pre-groove 91 may be formed concentrically.

Figure 19B:
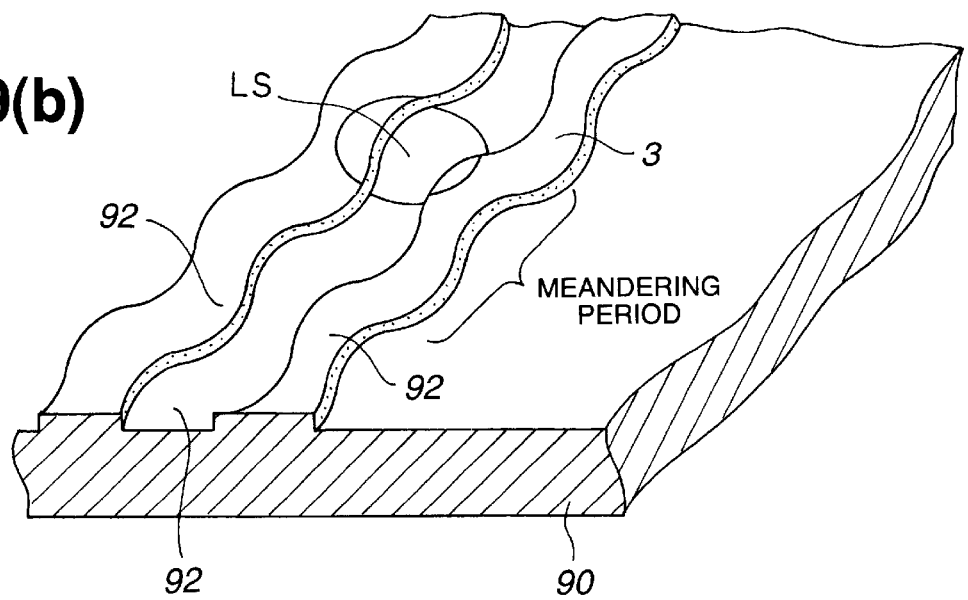

As shown in FIG. 19(b) as a fragmentary enlarged view, left and right wall sections of the pre-groove 91 are wobbled radially of the disc 90 in association with the address information. That is, these left and right wall sections meander radially of the disc 90 at a pre-set period corresponding to wobbling signals generated based on the address. An area defined between a given groove 91 and a neighboring groove 91 is a land 92. It is in the groove 91 that data is recorded. Therefore, the track pitch is the distance between the center of the groove 91 and the center of the neighboring groove 91.

Figure 2:
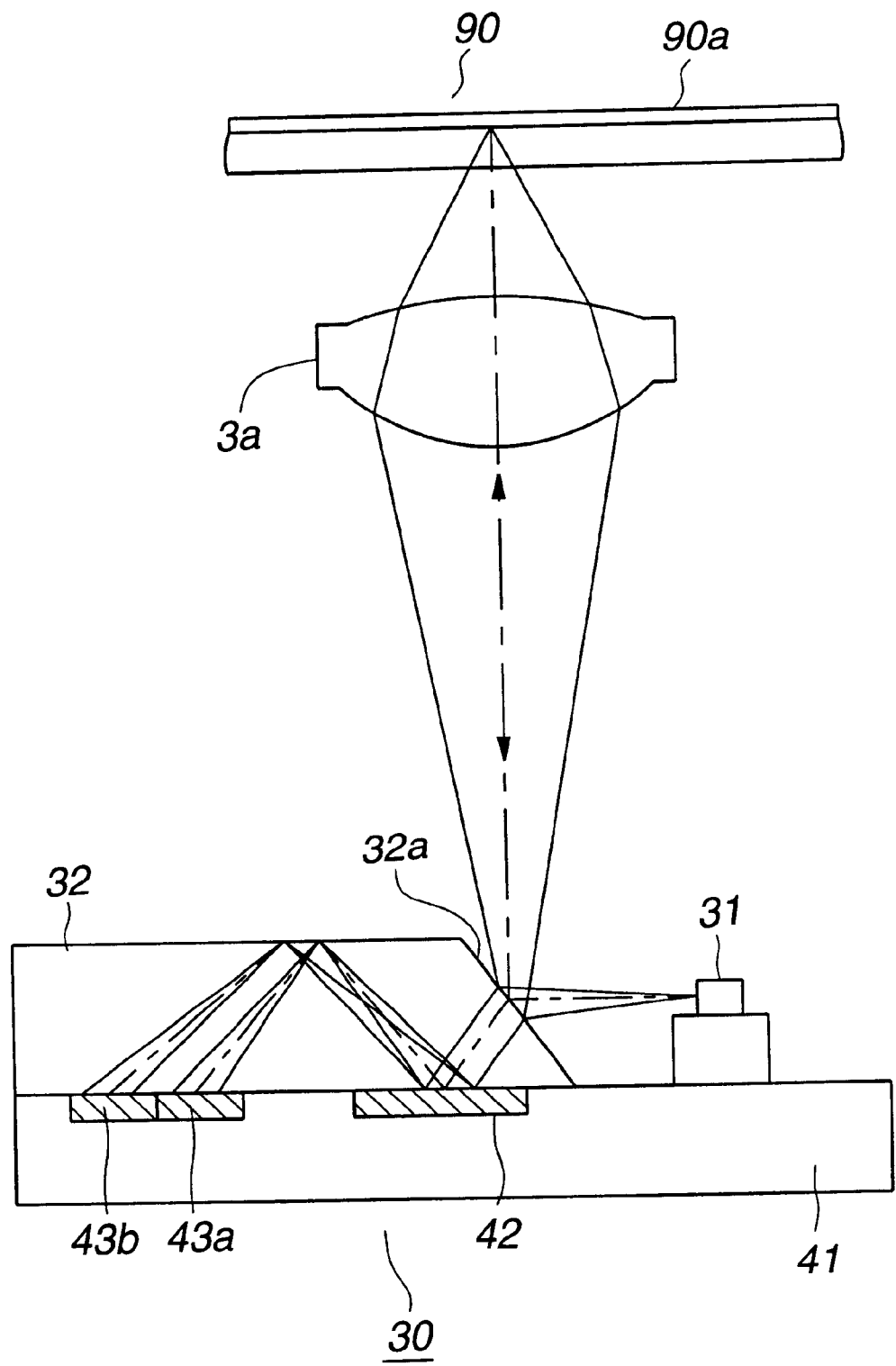
FIG. 2 is a side view showing an optical block of a recording and/or reproducing apparatus according to the present invention.
Figure 3:
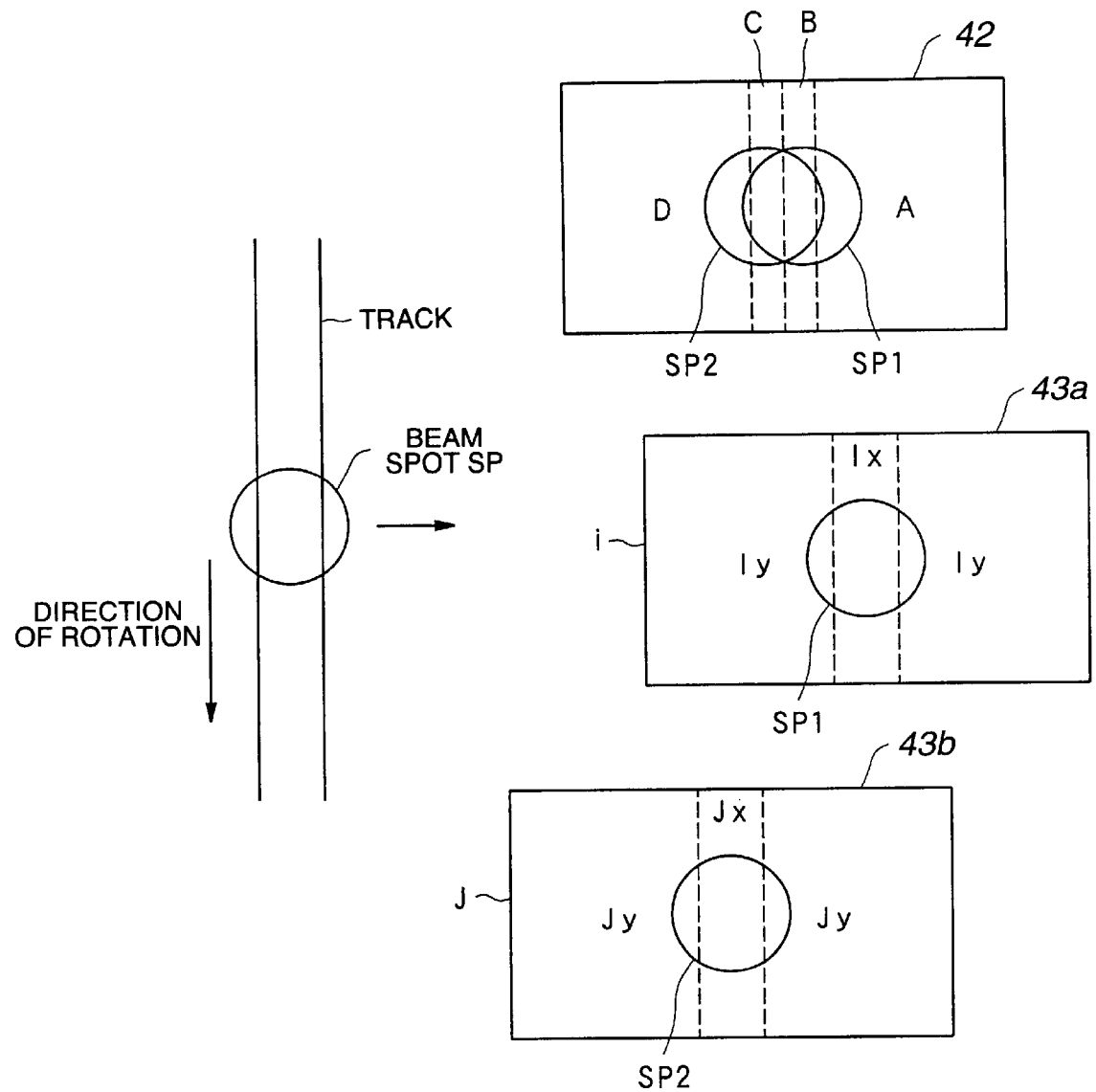
FIG. 3 illustrates a photodetector of the optical block.

The structure of the optical system of the optical pickup 3, loaded on the recording and/or reproducing apparatus 1 shown in FIG. 1, is now explained by referring to FIGS. 2 and 3.

FIG. 2 shows an illustrative structure of the optical system of the optical pickup 3 of the recording and/or reproducing apparatus 1 embodying the present invention.

The optical system of the optical pickup 3 is made up mainly of light emitting receiving element 30 and an objective lens 3a. The light emitting receiving element 30 is of a hybrid structure in which a laser diode 31, as a laser light source, and an optical prism 32, are loaded on a silicon substrate 41 carrying three photodetectors 42, 43a, 43b, as shown in FIG. 2. In this case, the light beam radiated from the laser diode 31 is reflected 90° towards the disc 90 by an end face 3a of the prism 32 and is converged by the objective lens 3a so as to be illuminated on a signal surface 90a of the disc 90. The reflected light from the signal surface 90a falls on the end face 32a of the prism 32, through the objective lens 3a, and is split by the end face 32a into two reflected light beams, which are reflected on the photodetector 42 to proceed upwards through the prism 32. Since a reflective film having high reflectance is formed on the upper surface of the prism 32, the reflected light from the photodetector 42 is further reflected by the reflective film on the upper prism surface. Thus, the light reflected by this reflective film is received by the photodetectors 43a, 43b.

FIG. 3 conceptually shows the relative positions of the three photodetectors 42, 43a, 43b formed on the light emitting receiving element 30.

The photodetector 42 is split into four detection areas A, B, C and D by splitting lines lying parallel to the track formed on the disc 90, as shown in FIG. 3. The photodetector 42 receives two light spots SP1, SP2 of the reflected light beams, split by the end face 32a of the prism 32 shown in FIG. 2. 50.

The photodetectors 43a, 43b are arranged with the same amount of shift in respective different directions in a direction along the radius of the disc 90, as shown in FIG. 3. The photodetectors are split by splitting lines parallel to the tracks formed on the disc into respective three detection areas Iy1, Ix, Iy2 and Jy1, Jx, Jy2, respectively. The photodetectors 43a, 43b receive light spots SP1, SP2 of the light reflected by the photodetector 42 and by the upper reflective film of the prism 32, in this order. Detection outputs of the detection areas A to D of the photodetector 42, detection areas Iy1, Ix, Iy2 of the photodetector 43a and from the detection areas Jy1, Jx, Jy2 of the photodetector 43b are routed as current signals to the RF amplifier 7 shown in FIG. 1. The RF amplifier 7 converts these input signals to voltage signals and executes calculation processing thereon as appropriate to generate respective different signals as required.

In the present specification, the voltage signals associated with the detection output of the detection area Ix of the photodetector 42 are denoted detection signals A to D.

A detection signal corresponding to the detection output of the detection area Ix of the photodetector 43a is denoted Ix, a detection signal corresponding to a detection output Iy1+Iy2 of the detection areas Iy1, Iy2 is denoted Iy, a detection signal corresponding to the detection output of the detection area Jx of the photodetector 43b is denoted Jx and a detection signal corresponding to a detection output Jy1+Jy2 of the detection areas Jy1, Jy2 is denoted Jy.

The RF amplifier 7 performs necessary computing processing on the detection signals from the photodetectors 42, 43a, 43b of the optical pickup 3 to generate various signals necessary for the recording and/or reproducing operation in the recording and/or reproducing apparatus 1. For example, the aforementioned pull-in signals, focussing error signals FE, tracking error signals THE, playback RF signals and lens shift signals LS are generated. For example, the pull-in signals PI are generated by the RF amplifier 7 by performing the processing of PI=(A+B+C+D) by exploiting detection signals A to D from respective detection areas A to D of the photodetector 42.

Figure 4:
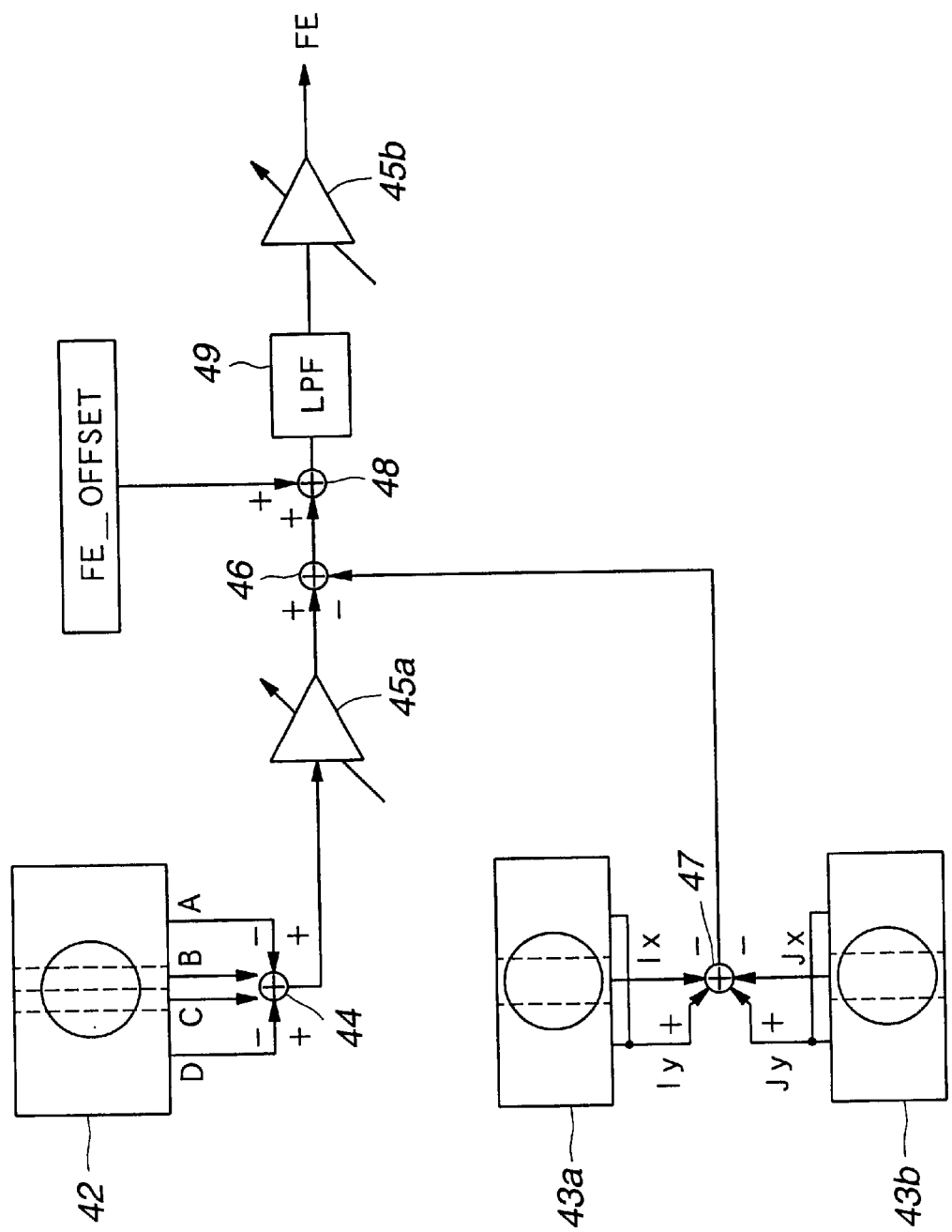
FIG. 4 is according to claim diagram showing a focussing error signal generating circuit employed in a recording and/or reproducing apparatus according to the present invention.

For generating the focussing error signals FE by the RF amplifier 7, processing is executed by a focussing error signal generating circuit, provided on the RF amplifier 7, as shown in FIG. 4. In this case, processing of detection signals A to D from the photodetector 42 {(A+D)−(B+C)} is executed by an arithmetic unit 44, with the gain of the processed output being routed to an arithmetic unit 46. Processing of detection signals Ix, Iy and Jx, Jy from the photodetector 43a and 43b {(Iy+Jy)−(Ix+Jx)} is executed by an arithmetic unit 47, with a processed output of the arithmetic being supplied to the arithmetic unit 46. The arithmetic unit 46 subtracts a processed output of the arithmetic unit 47 from a processed output of the arithetic unit 44 and a pre-set value as a focussing error offset is added to the subtraction output by an adder 48. The resulting sum is outputted through a low-pass filter (LPF) 49 and a gain amplifier 49b as focussing error signals FE.

The focussing error signal generating circuit exploits that fact that a detection output of the photodetectors 42, 43a, 43b is varied when the objective lens 3a is moved in a direction into contact and away from the disc, as shown in FIGS. 5(a) and 5(b). The waveform of a difference signal between detection signals from the detection areas A, D on an outer side of the photodetector 42 and those from the detection areas B, C on an inner side thereof, that is an output {(A+D)−(B+C)} of the arithmnetic unit 44 shown in FIG. 4, is as that in a signal Ma shown in FIG. 5(c).

On the other hand, the waveform of an output obtained on performing the processing {(Iy+Jy)−(Ix+Jx)} by the arithmetic unit 47 shown in FIG. 4 based on the detection signal from the detection areas Iy, Jy of the photodetectors 43a, 43b and on the detection signal from the detection areas Ix, Jx, is as in a signal Mij shown in FIG. 5(c). It is noted that curves of the signals Mα and Mij., obtained from the detection areas of the photodetectors 42, 43a, 43b, are in opposite phase to each other, as may be seen from the converging state of the light spot shown in FIGS. 5(a) and 5(b). The focussing error signal generating circuit shown in FIG. 4 subtracts the output (signal Mij) of the arithmetic unit 47 from the output (signal Mα) of the arithmnetic unit 44 by the arithmetic unit 46 to generate a signal corresponding to the actual focussing state shown in FIG. 5(d) to output the generated signal as the focussing error signals FE.

Figure 6A:
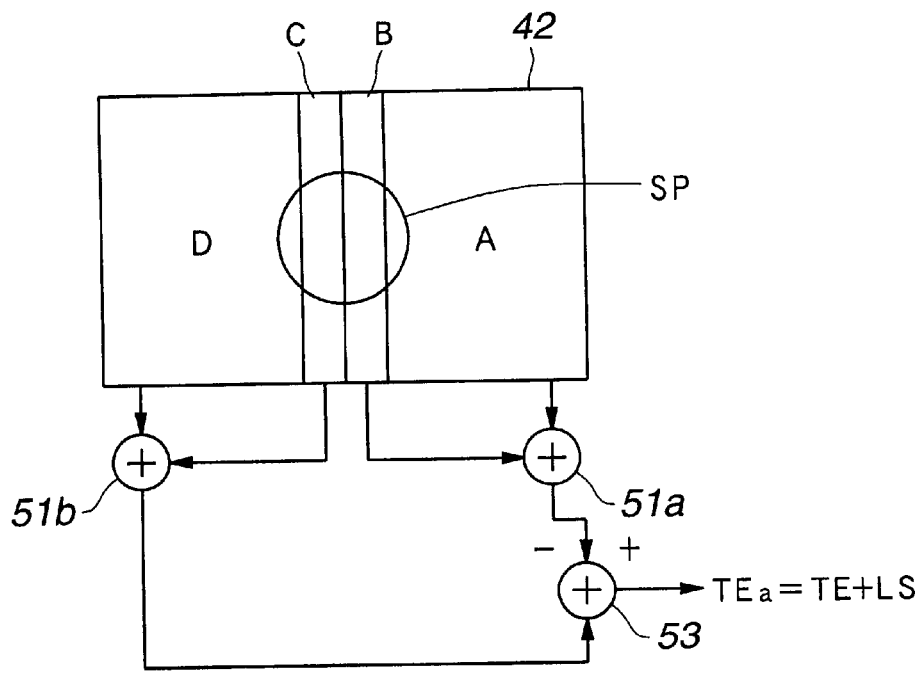
FIGS. 6($a$) and 6($b$) are circuit diagrams showing a tracking error signal generating circuit employed in the recording and/or reproducing apparatus according to the present invention.
Figure 6B:
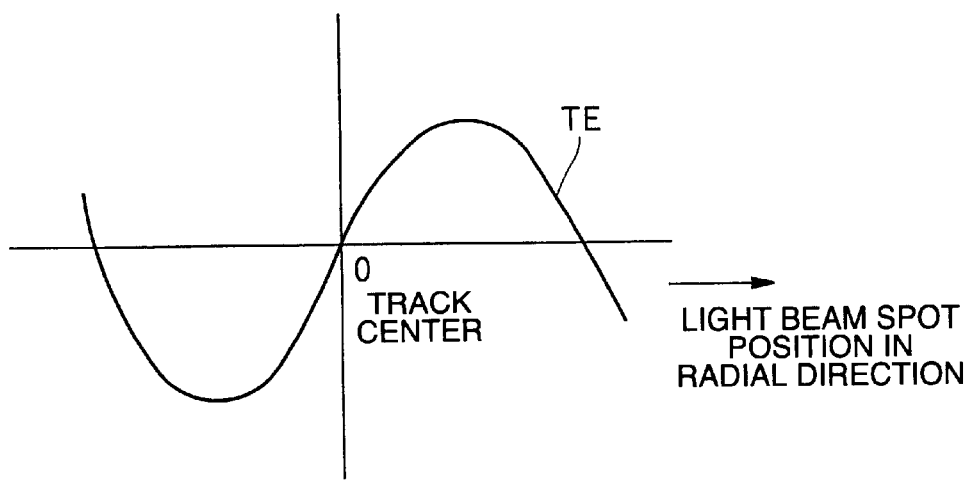

The circuit for generating the tracking error signals THE in the RF amplifier 7 is arranged as shown in FIG. 6(a). In this circuit, detection signals A, B from the detection areas A, B of the photodetector 42 are added together in an adder 51a, whilst detection signals C, D from the detection areas C, D are added together in an adder 51b. In a subtractor 53, an addition output (C+D) of the adder 51b is subtracted from the addition output (A+B) of the adder 51a to generate a tracking error signal TEa (TEa={(A+B)−C+D)}. The lens shift signal LS, generated by the lens shift signal generating circuit, is subtracted from the tracking error signal TEa comprised of the tracking error signals THE and the lens shift signal LS, summed together, to generate a tracking error signal THE freed of the lens shift signal LS. It is noted that the tracking error signal THE is such a signal the signal level of which is zero when the light spot of the light beam on the disc 90 is at the center of a track, with the signal level varying with the amount of shift between the light spot and the track center in the radial direction of the disc 90, as shown in FIG. 6(b).

The circuit generating the playback RF signal in the RF amplifier 7 exploits detection signals of the photodetector 43. For example, if the disc is a replay-only disc, the arithmetic processing of adding the detection signal I (I=Iy1+Ix+Iy2) of the photodetector 43b to the detection signal J (J=Jy1+Jx+Jy2) of the photodetector 43b, shown in FIG. 3, is carried out to generate playback RF signals.

If the disc loaded on the recording and/or reproducing apparatus 1 is a magneto-optical disc, the processing of subtracting the detection signal J of the photodetector 43b from the detection signal I of the photodetector 43a (I−J) is carried out to generate playback RF signals.

The RF aimplifier 7 of the recording and/or reproducing apparatus 1 of the present embodiment includes a lens shift signal generating circuit. This lens shift signal generating circuit generates a lens shift signal (lens position signal) corresponding to the amount of lens shift from a mechanical neutral position or point within the range of possible movement in the radial direction of the disc 90 of the objective lens 3a by the actuator 4. In the present embodiment, a variety of control operations during the recording and/or reproducing operation are carried out, as later explained, based on this lens shift signal.

If the species and structure of the discs that can be coped with, that is can be recorded and/or reproduced by the recording and/or reproducing apparatus 1, are considered, the areas that need to be detected by the photodetectors 42, 43a, 43b comprise a pit area and a groove area. The pit area corresponds to an entire signal surface of the replay-only disc, or a lead-in area lying at the innermost portion of a magneto-optical disc, whilst the groove area corresponds to an overwrite area of a magneto-optical disc.

It has been shown that, under the structure of the photodetectors 42, 43a, 43b of the present embodiment of the above-described configuration, the pit area and the groove area fit more readily to respective different detection systems, due to the difference in optical characteristics, in generating or detecting the lens shift signal LS. It has also been shown that the grooved area adapts itself to respective different lens shift signal detection systems in a tracking servo-on state and in a tracking servo-off state. Thus, in the present embodiment, three lens shift signal generating circuits are used, namely a first lens shift signal generating circuit which adapts itself to the pit area, a second lens shift signal generating circuit which adapts itself to the groove area in the tracking servo control on state, and a third lens shift signal generating circuit which adapts itself to the grooved area in the tracking servo control off state.

The first to third lens shift signal generating circuits are hereinafter explained in this order.

Figure 7:
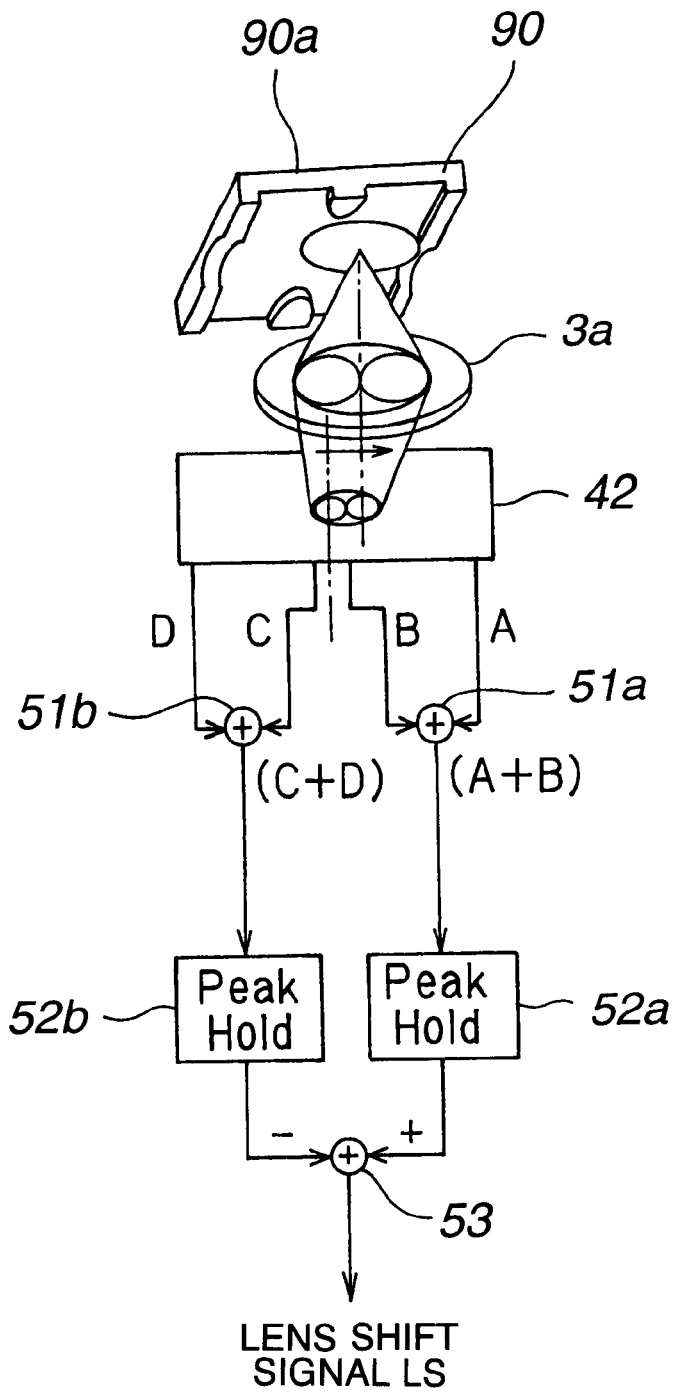
FIG. 7 is a circuit diagram showing a first lens shift signal generating circuit employed in the recording and/or reproducing apparatus according to the present invention.

FIG. 7 shows the structure of the first lens shift signal generating circuit.

The first lens shift signal generating circuit exploits the fact that, if the detection area of the disc 90 is a pit area, the tracking error signal THE {(A+B)−(C+D)} is proportional to the amount of lens shift. By holding a detection signal (peak signal) on a mirror surface, the lens shift signal LS is generated, in a manner which will be explained subsequently.

Thus, the first lens shift signal generating circuit is made up of adders 51a, 51b, peak-holding circuits 52a, 52b and a subtractor 53. In this case, detection signals A, B, outputted by the photodetector 42, are summed together by the adder 51a to give an output sum signal (A+B) which is routed to the peak-holding circuit 52a, whilst detection signals C, D, outputted by the photodetector 42, are summed together by the adder 51b to give an output sum signal (C+D) which is routed to the peak-holding circuit 52b. The peak-holding circuit 52a holds a peak value of the sum signal (A+B), whilst the peak-holding circuit 52b holds a peak value of the sum signal (C+D). The subtractor 53 subtracts the peak value held in the peak-holding circuit 52b from the peak value held by the peak-holding circuit 52a. The signal obtained by the subtractor 53 is outputted as the lens shift signal LS having a signal level corresponding to the shifting amount along the tracking direction of the objective lens 3a.

Figure 8:
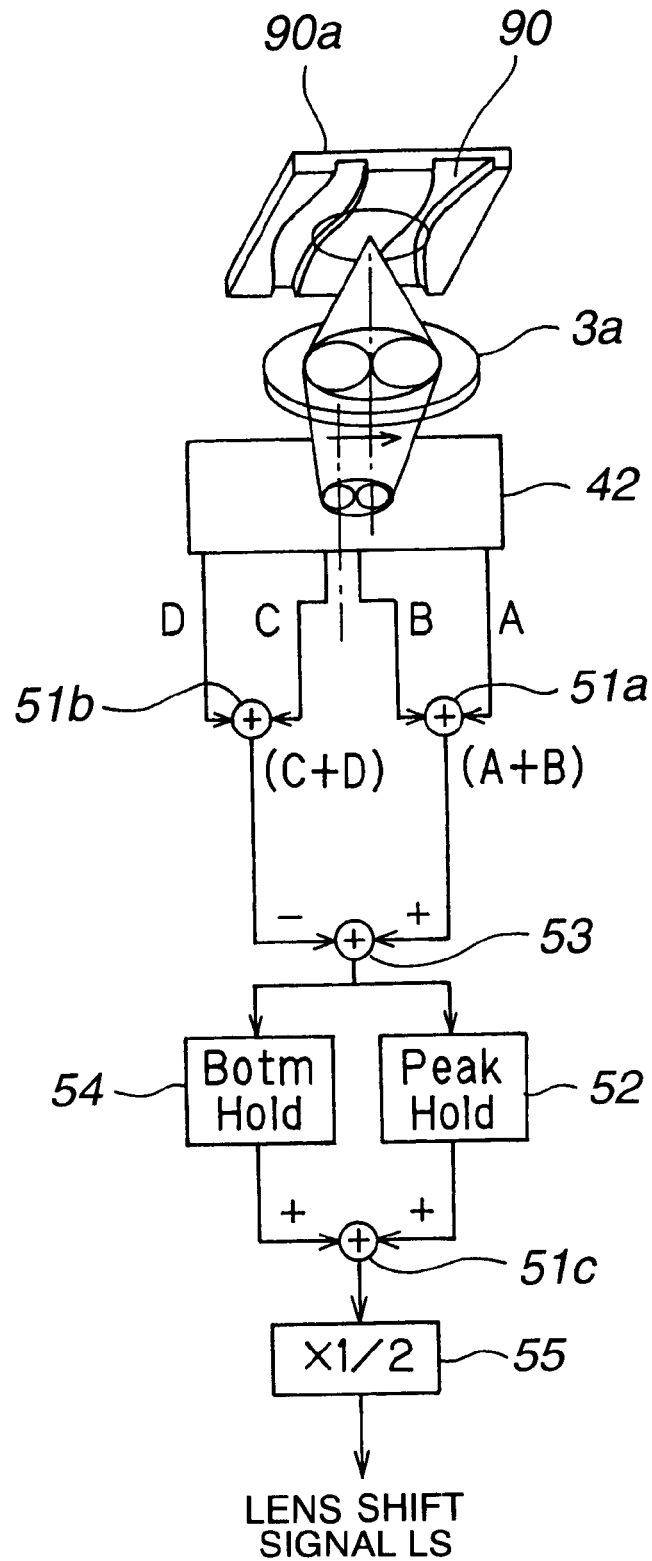
FIG. 8 is a circuit diagram showing a second lens shift signal generating circuit employed in the recording and/or reproducing apparatus according to the present invention.

FIG. 8 shows the structure of a second lens shift signal generating circuit.

This second lens shift signal generating circuit exploits the fact that, when the disc 90 is run with the tracking servo control off, the tracking error signal THE produced as a light spot illuminated on the disc 90 crosses a track in the grooved area is changed with the amount of lens shift. This second lens shift signal generating circuit is made up of adders 51a, 51b, 51c, a peak-holding circuit 52, subtractor 53, a bottom-holding circuit 54 and a 1/2 multiplication circuit 55.

The detection signals A, B from the photodetector 42 are summed by an adder 51a to produce a sum signal (A+B) which is routed to the subtractor 53. The detection signals C, D are suited together in the adder 51b, an addition output signal (C+D) of which is fed to the subtractor 53.

The subtractor 53 subtracts the sum signal (C+D) from the sum signal (A+B) to produce a subtraction output signal {(A+B)−(C+D)}, a peak value of which is sample-held in the peak-holding circuit 52 and a bottom value of which is sample-held by a bottom-holding circuit 54. The peak and bottom values, thus sample-held, are summed together by an adder 51c and halved by the halving circuit 55 for averaging. The signal outputted by the halving circuit 55 is outputted as the lens shift signal LS.

Figure 9:
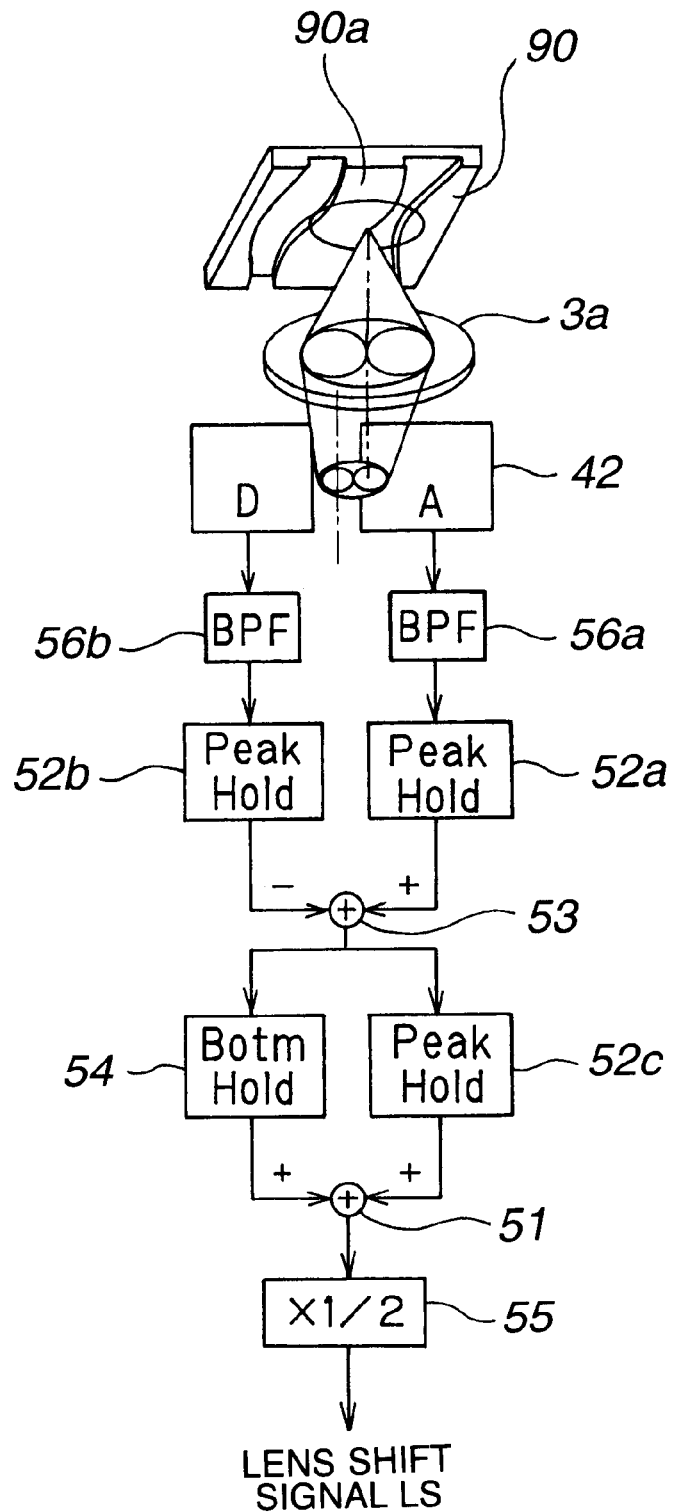
FIG. 9 is a circuit diagram showing a third lens shift signal generating circuit employed in the recording and/or reproducing apparatus according to the present invention.

FIG. 9 shows the structure of the lens shift signal generating circuit.

The third lens shift signal generating circuit exploits the fact that, if the detection area of the disc 90 is a grooved area, and the tracking servo control is going on, the left-to-right balance of the light spot obtained by the photodetector 42 is changed by de-tracking, however, the balance of demodulated components resulting from pre-groove wobbling is not changed on detracking. To summarize, the lens shift signal LS is produced from the balance of the wobbling levels from the detection areas A and D on both side of the photodetector 42. Thus, the third lens shift signal generating circuit is made up of band-pass filters (BPFs) 56a, 56b, peak-holding circuits 52a, 52b, subtractor 53, peak-holding circuit 52c, bottom-holding circuit 54, adder 51 and the halving circuit 55. The band-pass filters (BPFs) 56a, 56b are configured for passing the wobbling frequencies of the detection signals A and D of the photodetector 42, such as the center frequency of, for example, 22.5 kHz. In this arrangement, the detection signals A, D of the detection areas A and D of the detection areas A and D of the photodetector 45 are passed through the BPFs 56a, 56b, respectively, to extract only the wobbling modulation frequencies of the detection signals A and D. The peak values of the respective output signals are sample-held by the peak-holding circuits 52a, 52b. The subtractor 53 subtracts the peak value held in the peak-holding circuit 52b to hold peak and bottom values of the output subtraction signal by the peak-holding circuit 52c and the bottom-holding circuit 54, respectively. This peak value and the bottom value are summed together by the adder 51 and halved by the halving circuit 55. Specifically, this structure finds a difference of the peak values of the wobbling modulating components detected by the areas A and D on both sides of the photodetector 45 to output an average value derived from the peak and bottom values of the difference signal as the lens shift signal LS.

In the foregoing description, the first to third lens shift signal generating circuits are constructed separately from one another. However, since these the first to third lens shift signal generating circuits are not operated simultaneously, it is possible for these first to third lens shift signal generating circuits to co-own a circuit block and a changeover switch.

First, the recording and/or reproducing apparatus 1 of the instant embodiment controls the driving of an actuator 4 and a sled mechanism 5, as now explained. Based on the lens shift signal LS generated by the first to third lens shift signal generating circuits provided in the RF amplifier 7, as described above.

Figure 10A:
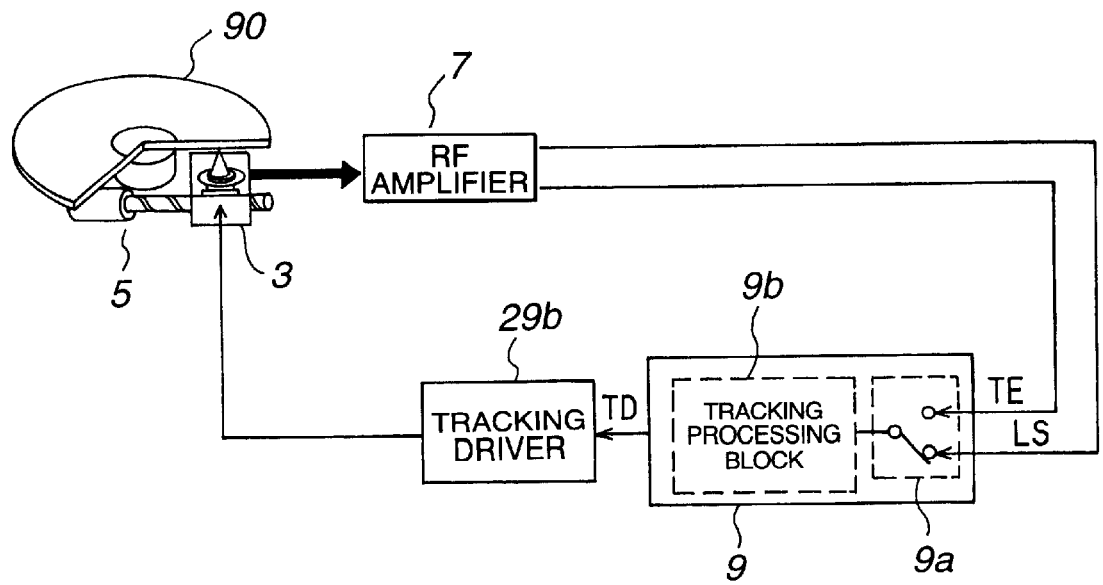
FIG. 10($a$) and FIG. 10($b$) are block diagrams showing a main structure of a servo block.
Figure 10B:
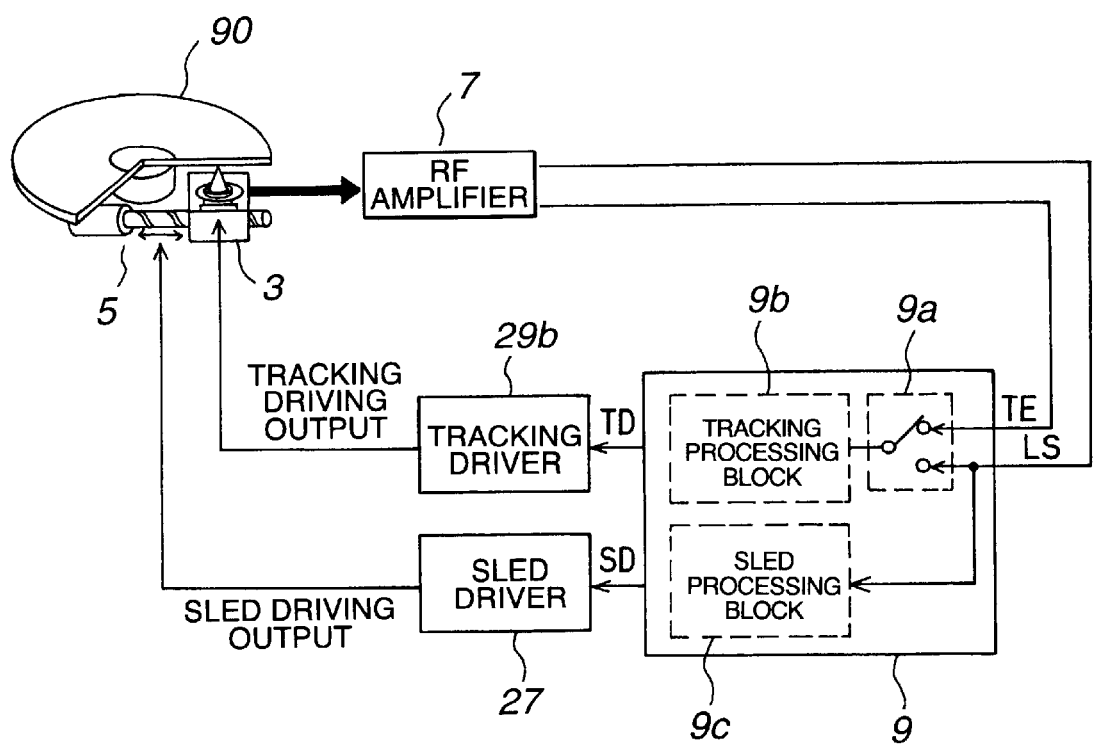

FIGS. 10(a) and 10(b) show a tracking servo circuit of the servo block of the recording and/or reproducing apparatus 1 shown in FIG. 1.

If the tracking servo control of the recording and/or reproducing apparatus 1 is off, and the objective lens 3a if the optical pickup 3 of the RF amplifier 7 is in the grooved area of the optical disc 90, the lens shift signal LS generated by the second lens shift signal generating circuit shown in FIG. 8 is routed via the switch 9a in the servo processor 9 as shown in FIG. 10(a). That is, in the recording and/or reproducing apparatus 1 of the instant embodiment, the lens shift signal LS is supplied in place of the tracking error signals THE to a tracking processing block 9b. In this case, the tracking processing block 9b generates a tracking driving signal TD, based on an amount of the error with respect to the level of the input lens shift signal LS, to cause the tracking driver 29b to perform driving control of the tracking coil of the actuator 4 by the tracking driving signal TD. That is, the tracking driver 29b executes the driving control of the objective lens 3a so that the lens shift signal LS will be converged to a 0 level. This controls the objective lens 3a to be positioned at a mechanical center of the actuator 4, that is at the mechanical neutral position.

For example, in a conventional recording and/or reproducing apparatus, the objective lens 3a is deviated from the mechanical neutral position, in a tracking servo control off state, depending on the position or using state of the recording and/or reproducing apparatus. Conversely, with the recording and/or reproducing apparatus of the instant embodiment, configured as described above, the objective lens 3a can be maintained in its mechanically neutral position without regard to the position or using state of the recording and/or reproducing apparatus.

In the recording and/or reproducing apparatus of the present embodiment, in which tracking pull-in control on starting the recording and/or reproduction is performed with the objective lens 3a in the mechanical neutral or mechanical center position, tracking servo control with the servo loop is started as from the state in which the objective lens 3a is at the mechanical center position. That is, tracking servo control is initiated as from the state in which the range of possible movement of the objective lens 3a along the disc radius is balanced between the inner and outer rims of the disc. This assures stable operation for the subsequent tracking servo control to improve the quality of the recorded and/or reproduced data correspondingly. For example, in the conventional recording and/or reproducing apparatus, the range of possible movement of the objective lens 3a is selected to be wide enough to maintain optimum tracking servo control, that is driving control of the objective lens 3a, during a certain time period, if tracking servo control is applied with the objective lens 3a being offset from the mechanically neutral position under the effect of gravity, with the optical block and the driving circuitry being configured correspondingly.

Conversely, with the recording and/or reproducing apparatus of the present embodiment, there is no necessity of taking the offsetting of the objective lens 3a into account on initiating tracking servo control. Thus, the range of the possible movement of the objective lens 3a along the disc radius can be selected to be narrower than conventionally to enable the optical block or the driving circuit to be designed in a corresponding fashion. Thus, the optical block can be reduced in size so that the driving circuit may also be designed sufficiently to drive the small-sized optical block.

Also, the recording and/or reproducing apparatus 1 of the instant embodiment is in need of a magnetic head 6a for recording. This magnetic head 6a needs to be sized in meeting with the range of possible movement, that is the laser illumination enabling range, of the objective lens 3a by the actuator 4. This accounts for a larger size of the magnetic head in the conventional system in keeping with the range of the possible movement of the objective lens 3a. In the instant embodiment, the magnetic head can be smaller in size in proportion to reduction in the range of the possible movement of the objective lens 3a along the disc radius.

Thus, with the recording and/or reproducing apparatus 1 of the instant embodiment, the head mechanism, such as that of the optical head or the magnetic head, and hence the recording and/or reproducing apparatus, can be reduced in size.

Meanwhile, in the arrangement shown in FIG. 10(a), the lens shift signal generating circuit for sending the lens shift signal LS to the tracking processing block 9b is the first lens shift signal generating circuit or the second lens shift signal generating circuit if the detection region of the disc is the pit area or the grooved area, respectively. This selection of the signal supply or the generating circuit is performed in reality under control by the system controller 11. For example, the system controller 11 discriminates the position of the objective lens 3a or the optical pickup 3, based on address data supplied from the address decoder 10, to select the lens shift signal LS outputted from the first or second lens shift signal generating circuit to route the selected signal to a tracking processing block 9.

In the recording and/or reproducing apparatus 1 of the instant embodiment, if the tracking servo control is on, the lens shift signal LS is routed to a sled processing block 9b of the servo processor 9, as shown in FIG. 10(b). In this case, the tracking processing block 9b is fed with the tracking error signal THE through a switch 9a to execute the tracking servo control with the usual closed servo. In this arrangement, a sled processing block 9c generates a sled driving signal SD, based on the input lens shift signal LS. It is by this sled driving signal SD that a sled driver 27 performs the driving control of a sled mechanism 5.

The control operation performed at this time is schematically as follows:

By the tracking servo control, the objective lens 3a is driven along the radius of the disc 90 to follow the track of the disc 90. That is, the objective lens 3a is moved in a direction away from the mechanically neutral position. Therefore, the lens shift signal LS is progressively increased in level. The sled processing block 9c monitors this lens shift signal LS. For example, if the sled processing block 9c monitors the signal level of the lens shift signal and finds that it has reached a pre-set limit position, the sled processing block 9c drives the sled mechanism 5 in a necessary direction to perform control so that the objective lens 3a will be subsequently at a mechanically neutral position.

In the structure shown in FIG. 10(b), the lens shift signal generating circuit for furnishing the lens shift signal LS to the tracking processing block 9b is then set to the first or second lens shift signal generating circuit if the detection area of the disc is the pit area or the grooved area, under signal switching by the system controller 11.

If the lens shift signal LS is used for driving control of the sled mechanism 5, the following merit is obtained.

For example, in the conventional recording and/or reproducing apparatus, the sled mechanism 5 is driving-controlled based on the sled error signal SD extracted from the tracking error signal components. With such sled error signal SD, as compared to the lens shift signal LS, it is retained to be difficult to grasp the lens position of the objective lens correctly. Thus, a narrower movement range in the possible movement range is set to evade the situation in which driving control for the sled mechanism 5 is not started even although the objective lens has exceeded the optimum movable range, such that driving control will be executed if the movable range is subsequently exceeded.

On the other hand, in the recording and/or reproducing apparatus 1 of the instant embodiment, the sled driving control is performed based on the lens shift signal LS. Since the signal level itself of the lens shift signal LS indicates the amount of offset of the objective lens 3a along the radius of the disc 90, the sled processing block 9c is able to grasp the amount of offset of the objective lens 3a along the radius of the disc 90 correctly before proceeding to the controlling of the sled mechanism 5. Thus, in the present embodiment, it is possible to perform sled control by effectively utilizing the entire possible movement range of the objective lens 3a in the actuator 4. As a result, the number of times of sled movement can be smaller than conventional.

The driving control of the sled mechanism when the recording and/or reproducing apparatus 1 of the instant embodiment performs the intermittent recording and/or reproduction is hereinafter explained.

In the recording and/or reproducing apparatus 1 of the instant embodiment, the data transfer speed between the disc 90 and the buffer memory 13 during the recording and/or reproduction differs from that between the buffer memory 13 and the encoder/decoder 14, as explained previously. Thus, there is obtained the operation in which data readout from the disc 90 or data writing on the disc 90 occurs intermittently depending on the amount of data storage in the buffer memory 13.

Figure 11A:
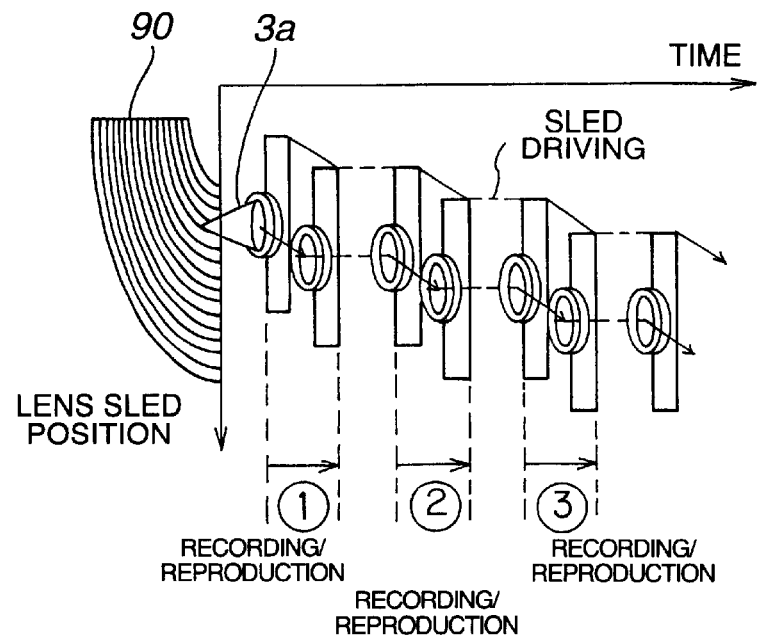
FIGS. 11($a$) and 11($b$) schematically show an intermittent recording and/or reproducing operation in the recording and/or reproducing apparatus according to the present invention.

FIG. 11(a) schematically shows the manner of driving control during intermittent recording and/or reproduction in the conventional practice.

In FIG. 11(a), the data readout/write period for the disc 90 is indicated as ①, ②, ③. Here, the data readout or data writing for the disc 90 occurs in the sequence of ①→②→③ during the data readout/write period. The respective periods between the data readout/write periods ①, ②, ③ on the time axis represent the pause period during which the readout or writing for the disc ceases.

During the data readout/write period, the light beam is outputted to permit the data readout or writing to take place, and subsequently the tracking servo control is performed. The driving control to be executed by the tracking servo occurs in a similar manner, that is so that the driving control occurs as appropriate during the data readout/write period, based on the sled error signal, as indicated by the respective periods ①, ②, ③. During the pause period, the outputting of the light beam from the optical pickup 3 ceases, whilst the driving control for the sled mechanism 5 also ceases.

In the above-described structure, it may be an occurrence that, during the data readout/write period, laser outputting and the sled driving by the sled mechanism 5 occur simultaneously.

The laser outputting consumes much power. In particular, the laser power and hence the power consumption are higher during the recording than during the reproduction. If, in this operating state, the sled driving occurs simultaneously, the power consumption for sled driving adds to that for laser output, thus appreciably increasing the power consumption, even if transiently. In the case of a portable recording and/or reproducing apparatus driven by e.g., a battery power source, the current flowing from the battery power source is increased to lower the battery voltage correspondingly. In such case, this state may be taken to be a battery up state to lead to compulsive termination of the recording and/or reproducing operation. It is therefore desirable that the maximum power consumption in the recording and/or reproducing apparatus be as small as possible.

Figure 11B:
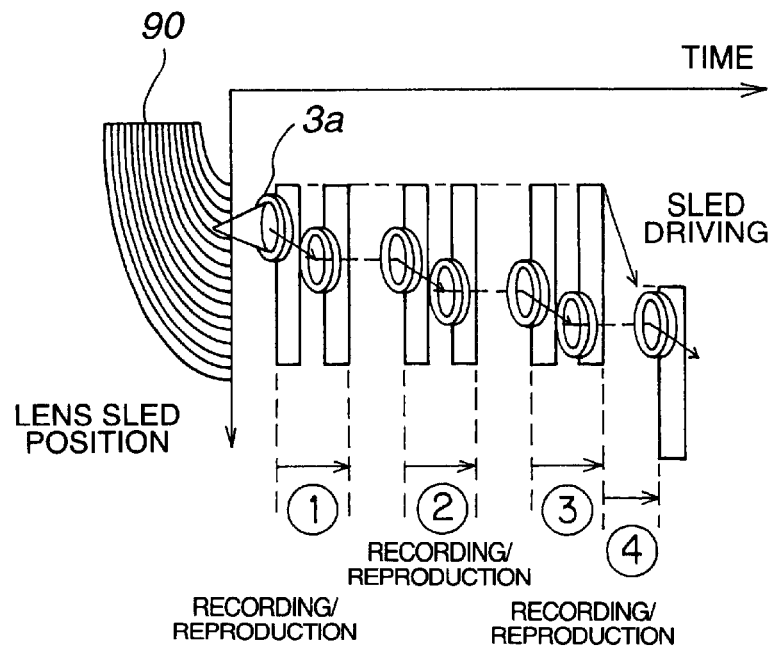

Thus, in the recording and/or reproducing apparatus of the instant embodiment, sled driving is executed such as to exploit the intermittent recording and/or reproducing operation, as shown in FIG. 11(b).

In FIG. 11(b), the data readout/write periods are similarly denoted ①, ②, ③ sequentially along the time axis. The periods between these data readout/write periods ①, ②, ③ represent pause periods. As may be seen from FIG. 11(b), the recording and/or reproducing apparatus 1 of the instant embodiment does not perform sled driving control data readout/write periods ①, ②, ③. That is, the only driving control for the actuator 4 for causing movement only of the objective lens 3a in a direction along the radius of the disc 90 is performed as tracking servo control.

It is assumed that the position and the status of the objective lens 3a in need of sled movement is realized at the time of the end of the data readout/write period (③). It is the servo processor that monitors this position and the state based on the lens shift signal LS obtained during the data readout/write period. If such state is reached, data readout/ write period (③) expires such that sled driving is executed during the next pause period ④. The amount of sled movement at this time is determined based on the lens shift signal LS obtained last during the directly previous data readout/write period ③. It is assumed that this lens shift signal LS has been obtained during the tracking servo control on period.

In this sled control, there is no risk that the laser outputting and sled driving occur simultaneously such that the maximum power consumption during the recording and/or reproduction can be smaller than in the conventional practice. This eliminates the risk that decision on the battery up state be given prematurely to enable a longer recording and/or reproducing operation.

In the above-described sled driving control, the number of times of sled driving at the time of the recording and/or reproducing operation during a given time period can be reduced, depending on the range of movement of the objective lens 3a, thus correspondingly reducing the power consumption.

Meanwhile, during the pause period when the recording and/or reproducing operation is not going on, the laser outputting comes to a standstill such that tracking servo control is not executed. Therefore, in order to correctly execute the driving control of the sled mechanism 5 during the pause period, it is desirable to use a stepping motor which allows for facilitated rotary angle control as the sled motor of the sled mechanism 5. That is, if the stepping motor is used, it is possible to perform correct sled driving control by effecting rotational driving of the motor so that the amount of the sled movement as required will correspond to the rotational angle of the motor.

The recording and/or reproducing apparatus 1 of the instant embodiment performs the accessing operation in the following manner by exploiting the lens shift signal.

Figure 12:
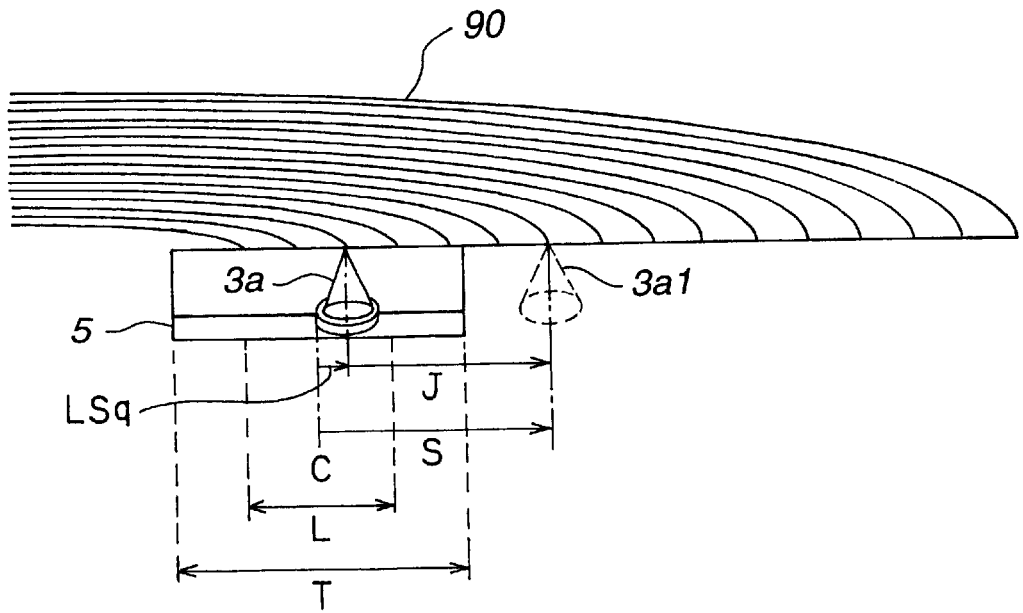
FIG. 12 illustrates the accessing operation in the recording and/or reproducing apparatus according to the present invention.

In the following explanation of the accessing operation in the instant embodiment, the range of possible lens shifting movement L is defined as being the range of possible movement for which normal recording and/or reproducing operation is assured even if the objective lens 3a is driven in the tracking direction by the actuator 4 of FIG. 1, as shown in FIG. 12. Also, the range of possible track jump T is defined as being the maximum range through which the objective lens 3a can be physically driven in the tracking direction by the actuator 4. Usually, designing is so made that the range of possible track jump T is longer than the range of possible lens shifting movement L such that the recording and/or reproducing operation is not performed in the range of possible track jump T. The range of possible track jump T and the range of possible track jump T are set based on the structure and characteristics of the optical pickup 3.

The center position of the actuator 4 along the radial direction of the disc 90 is defined as being the mechanical neutral position C. The amount of offset from this mechanical neutral position C to the current position of the objective lens 3a is defined as being an amount of the lens shift Lsq. The number of tracks jumped over when the objective lens 3a is moved from the current position of the objective lens 3a to the target position being accessed, that is the position of the objective lens 3a1 shown by a broken line, is defined as being the number of track jumps J. The distance obtained from the amount of the lens shift Lsq and the number of jumps J, that is the amount of movement from the mechanical neutral position C to the target position (objective lens 3a1), is defined as being the amount of sled movement S.

If an accessing request is made for accessing to a certain target position (address), the servo processor 9 finds the amount of lens shift as from the mechanically neutral position C of the objective lens 3a, based on the lens shift signal LS. The servo processor 9 calculates the number of jumps J based on the distance (amount of addresses) from the current position (address) of the objective lens 3a to the target position (address) the servo processor 9 finds the amount of sled movement S from the amount of the lens shift Lsq and the number of jumps J in accordance with the arithmetic processing shown by $S=Lsq+J.$ FIG. 13 shows a case wherein the amount of sled movement S, calculated as described above, is within or smaller than the range of possible lens shift L.

If this equation is met, track jump is executed, by actuating the objective lens 3a in the optical pickup 3 to the target position (objective lens 3a), by way of performing accessing control. That is, the accessing processing performed is not accompanied by sled movement control. For example, a driving signal corresponding to the amount of sled movement S is sent from the tracking driver 29b to the actuator 4 to cause movement of the objective lens 3a in a direction along the radius of the optical disc 90.

Figure 14:
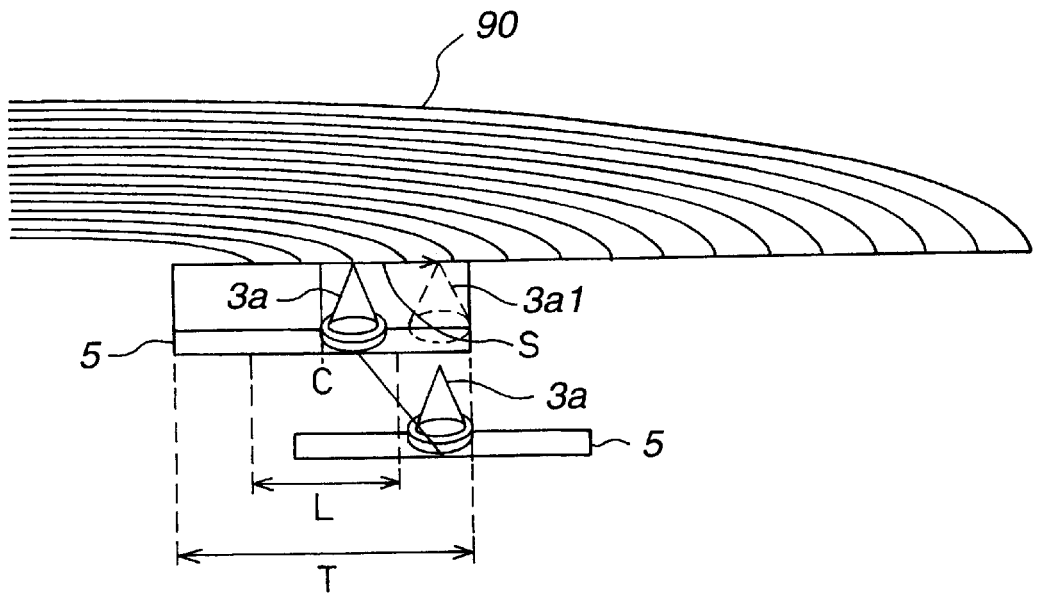
FIG. 14 illustrates the accessing operation in the recording and/or reproducing apparatus according to the present invention.

If the amount of sled movement S is larger than the range of possible lens shift L and smaller than the range of possible track jump T, the sled mechanism 5 is controlled so that the optical pickup 3 will be transported in an amount corresponding to the amount of sled movement S, as shown in FIG. 14.

Figure 13:
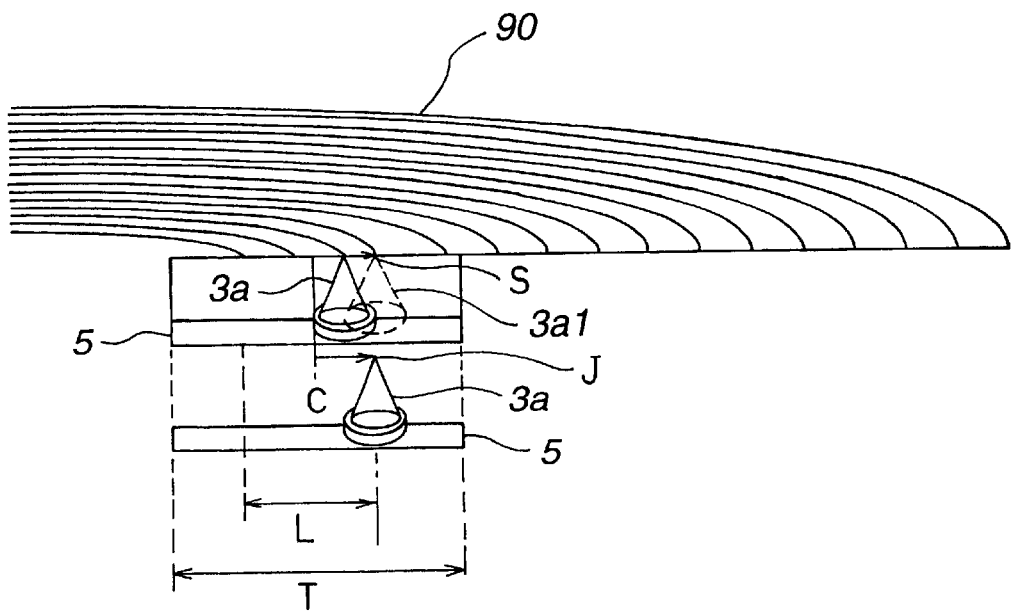
FIG. 13 illustrates the accessing operation in the recording and/or reproducing apparatus according to the present invention.

After driving-controlling the sled mechanism 5 as described above, the track jump operation, shown for example in FIG. 13, is actually performed to permit rough accessing position correction until accessing to the target position is ultimately completed.

Figure 15:
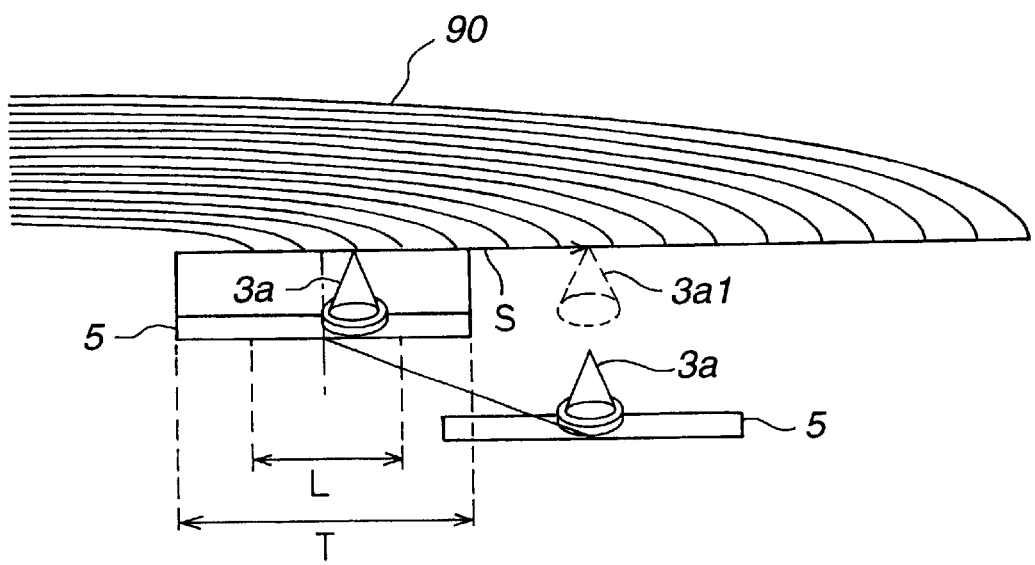
FIG. 15 illustrates the accessing operation in the recording and/or reproducing apparatus according to the present invention.

If the amount of sled movement S exceeds the range of possible track jump T, the sled mechanism 5 is driving-controlled so that the optical pickup 3 will be transferred in an amount corresponding to the amount of sled movement S, as shown in FIG. 15. In this case, rough correction of the accessing position is done by executing the sled movement control explained in connection with FIG. 14 and the track jump control operation shown in FIG. 13.

In association with the processing operation which will be explained subsequently, the accessing operation shown in FIGS. 13 and 14 is processed as being track jump because the amount of sled movement S is within the range of possible track jump, whilst the accessing operation shown in FIG. 15 is treated as so-called seek operation because the amount of sled movement S exceeds the range of possible track jump.

The lens shift signal LS is calculated to include the amount of the lens shift Lsq, so that, if the sled movement is performed as shown in FIGS. 14 and 15 in accordance with this amount of sled movement S to complete the accessing operation, the objective lens 3a can be approximately at the mechanically neutral position. Thus, if the tracking servo control is initiated e.g., after the end of the accessing, it is possible to write or read out data for the disc beginning from the state in which the objective lens 3a is approximately at the mechanically neutral position.

As the lens shift signal LS, used for calculating the amount of sled movement S in driving-controlling the sled mechanism 5, the lens shift signal LS acquired when the accessing is demanded during recording and/or reproduction may be used. That is, the lens shift signal LS used is basically the lens shift signal LS acquired when the tracking servo control is going on.

Figure 16:
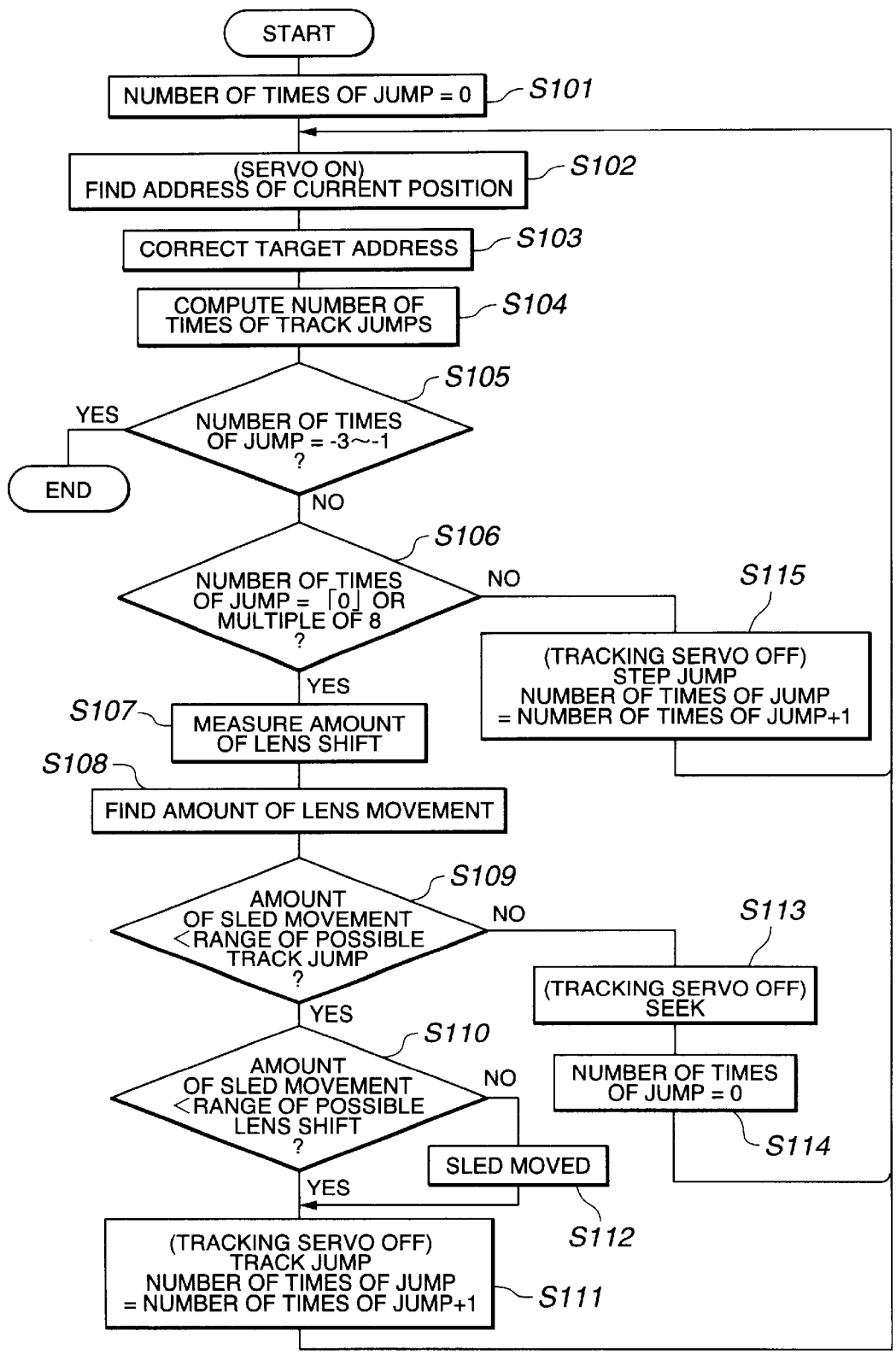
FIG. 16 is a flowchart showing the processing operation of a system controller during the accessing operation to the recording and/or reproducing apparatus according to the present invention.

The processing operation by the system controller 11 corresponding to the accessing operation explained in connection with FIGS. 12 to 15 is explained with reference to the flowchart of FIG. 16. Meanwhile, this processing is that performed after an accessing request has been made. At this time point, the information on the target position (address) is held by the system controller 11. In this case, the system controller 11 at step S101 first resets the value of the number of jumps to 0, after which the system controller 11 advances to step S102 to turn the tracking servo control on. The system controller 11 then executes the processing of discriminating the address of a position on the disc 90 currently accessed by the objective lens 3a or the optical pickup 3, that is the address acquired from the signal surface 90a of the disc 90.

After discriminating the address of the current position, the system controller 11 advances to step S103 to correct the target address so that the address slightly, specifically, several addresses in advance of the address of the target position demanded to be accessed will become a real address. The system controller 11 then advances to step S104.

At step S104, the number of track jumps J is calculated from the address of the current position and from the address of the target position corrected at step S103.

At the next step S105, it is discriminated whether or not the number of track jumps J calculated at step S104 is within the range of −3 to −1. If the number of track jumps J is within the range of −3 to −1, the accessing operation is directly terminated. That is, if the address of the current position is immediately before the address of the target position, there is no necessity for track jump such that it is only sufficient if a standby state is set until the address required for accessing is reached. Therefore, the accessing processing can be brought to a close without doing track jump.

If, at step S105, the number of track jumps J is not within the range of −3 to −1, the system controller 11 advances to step S106. If the number of times of track jump, indicating the number of times of track jump, is a multiple of 8, such as 0, 8, 16,24, . . . , the system controller 11 advances to step S107 and, if otherwise, to step S115. That is, if, at step S106, the number of times of track jump is a multiple of 8, the system controller 11 advances to the processing downstream of step S107 to move to the accessing processing accompanied by track jump or seek shown in one of FIGS. 13 to 15. If, at step S106, the number of times of track jump is not a multiple of 8, such that it is 1, 2, . . . , 7, 9, . . . , the system controller 11 advances to step S115 for a step jump mode, which is an operation of performing track jump over one to several tracks which is smaller than in the track jump as meant herein.

For example, the accessing operation explained previously with reference to FIGS. 13 to 15 is actually no more than an accessing operation to the target position with rough precision. In reality, a fine accessing operation for minute adjustment is subsequently performed within the range of a pre-set maximum number of times of operation. This fine accessing operation for minute adjustment is the aforementioned step jump mode performed at step S115.

Meanwhile, 0 or multiples of 8 are used as the number of track jumps for advancing to step S117 only as an illustration. Although transfer to the track jump mode is necessary at least at the start of the accessing for which the number of track jumps is 0, the number of track jumps other than 0 can be optionally set depending on the actual operating performance.

At step S107, the amount of the lens shift Lsq is measured as explained previously with reference to FIG. 12 and, at the subsequent step S108, the amount of sled movement S is calculated from the number of track jumps J as found at step S108 and from the amount of the lens shift Lsq as measured at step S107.

At the next step S109, it is verified whether or not the amount of sled movement S as calculated at step S108 is within the range of possible track jump T. If the amount of sled movement S is within the range of possible track jump T, the system controller 11 advances to step S110 to verify whether or not the amount of sled movement S is within the range of possible lens shifting movement L. It is noted that, if the amount of sled movement S is within the range of possible lens shifting movement L, the system controller 11 advances to step S111 and, if otherwise, to step S112.

At step S111, the tracking servo control is turned off and, as the number of tracks jumped over is counted based on the traverse signals acquired from e.g., the signal surface 90a of the disc 90, the objective lens 3a is actuated to jump to the target track, by way of performing the accessing operation shown in FIG. 13.

After the end of the track jump, the number of track jumps is incremented by one. The system controller 11 then reverts to step S102.

On the other hand, when the processing has transferred from step S110 to step S112, control processing is carried out to cause movement of the sled mechanism 5 in an amount corresponding to the amount of sled movement S. This processing at step S112 is the track jump operation accompanied by sled movement shown in FIG. 14. In this processing, the processing shown in FIG. 13 is executed after executing the processing shown in FIG. 14 to make rough correction of the accessing position.

If it is verified at step S109 that the amount of sled movement S exceeds the range of possible track jump T, the system controller 11 advances to step S113.

At step S113, the tracking servo control is turned off, after which the processing of driving controlling the sled mechanism 5 in an amount corresponding to the amount of sled movement S relative to the servo processor 9 is executed. Here, the seek operation shown in FIG. 15 is executed.

Since the seek operation is the accessing of significantly lower precision than the track jump operation shown in FIGS. 13 and 14, the value of the number of track jumps is reset at step S114 to 0. The system controller 11 then reverts to step S102. If no affirmative result is obtained at step S105, the system controller 11 advances to step S17 ff to carry out the accessing operation of FIG. 13, FIG. 14 or incidentally the accessing operation of FIG. 15 in order to reach the ultimate target address.

If, at step S106, the number of times of jumps is found not to be 0 or a multiple of 8, and the system controller 11 advances to step S115, the aforementioned step jump is performed, with the tracking servo control then being turned off. The system controller 11 reverts to step S102, after incrementing the value of the number of track jumps by one.

If the accessing controlling is executed by the above-mentioned processing and it has been ultimately found that the number of track jumps J is within the range of −3 to −1, the accessing has come to a close.

The recording and/or reproducing apparatus of the instant embodiment is suited as a portable type device. The apparatus may, of course, be applied to a floor type apparatus. If the apparatus is of the floor type, the present invention remains valid if it may be mounted vertically or horizontally, that is it has a degree of freedom in its mounting state.

In the above-described embodiment of the recording and/or reproducing apparatus, the magneto-optical disc is used as a recording medium. The present invention is, however, not limited to this configuration, since it may be applied not only to a CD (compact disc), a CD-ROM or CD-R (compact disc-read only memory), but to a data recording and/or reproducing apparatus termed MO or to a recording and/or reproducing apparatus adapted to cope with the DVD (digital versatile disc) nowadays finding widespread use.

The present invention is useful both for recording and reproduction and may be applied to a write-only or read-only apparatus.

Industrial Applicability

With the recording and/or reproducing apparatus for an optical disc according to the present invention, the objective lens is moved along the radial direction of the optical disc perpendicular to the optical axis of the objective lens, based on at least one of the lens shift signal generated by a lens shift signal generating circuit and the error signal generated by an error signal generating circuit, whilst the optical pickup is moved along the radial direction of the optical disc based on the current position of the objective lens, distance to the target movement position of the objective lens and the lens shift signal. Thus, tracking control is performed as from the state in which the objective lens is set to the mechanically neutral position to realize stable tracking control with high reliability.

What is claimed is:

1. A recording and/or reproducing apparatus for an optical disc, comprising:

an optical pickup including
a light source configured to illuminate a light beam on an optical disc on which data have been recorded spirally or toroidally and address information are also recorded, said optical disk including a pit area having the above data recorded as pits and a grooved area having a groove for recording the address information,
an objective lens for converging a light beam radiated from the light source on the optical disc,
a first photodetector configured to receive a converged light beam reflected from said signal surface, said photodetector having first to fourth photodetector segments split by boundary lines running parallel to the tracks of said optical disc, the first to fourth photodetector segments operative to output signals corresponding to the pit area and the grooved area of the optical disk,
a second and third photodetector configured to receive a light reflected from said first photodetector, and
an actuator configured to move said objective lens in a radial direction of said optical disc perpendicular to the optical axis of the objective lens;
an error signal generating unit configured to generate an error signal used to move the objective lens in the radial direction of the optical disc perpendicular to the optical axis of the optical disc, based on the amount of shift in the radial direction of the optical disc of the light beam converged by the objective lens on the signal surface of the optical disc to scan the track on the optical disc, based on the output signals of said first to fourth photodetector segments;
a shift signal generating unit configured to generate a lens shift signal corresponding to the amount of shift from a neutral position of the objective lens, based on the output signals of said first to fourth photodetector segments; and a servo controller configured to drive said actuator, based on at least one of the lens shift signal and the error signal, and to move said objective lens in the radial direction of said optical disc perpendicular to the optical axis of said objective lens.

2. The recording and/or reproducing for an optical disc according to claim 1, wherein said shift signal generating unit comprises a first signal generating unit configured to generate a lens shift signal, corresponding to an amount of shift from the neutral position of said objective lens, based on the output signals of said first to fourth photodetector segments, when the light beam converged by said objective lens on the signal surface of the optical disc is scanning the pit area of said optical disc; and a second signal generating unit configured to generate a lens shift signal, corresponding to an amount of shift from the neutral position of said objective lens, based on the output signals of said first to fourth photodetector segments, when the light beam converged by said objective lens on the signal surface of the optical disc is scanning the grooved area of said optical disc.

3. The recording and/or reproducing for an optical disc according to claim 2, wherein said first signal generating unit performs subtraction on a sample-held peak value of signals corresponding to the sums of respective output signals of said first and second photodetector segments and a sample-held peak value of signals corresponding to the sums of respective output signals of said third and fourth photodetector segments.

4. The recording and/or reproducing for an optical disc according to claim 3, wherein said first signal generating unit includes a first adder configured to sum respective output signals of said first and second photodetector segments, a first peak-holding unit configured to hold peak values of the output signals of said first adder, a second adder configured to sum respective output signals of said third and fourth photodetector segments, a second peak-holding unit configured to hold peak values of the output signals of said second adder, and a subtractor configured to substract output signals of said first and second peak-holding units.

5. The recording and/or reproducing for an optical disc according to claim 2, wherein said second signal generating unit includes an operation-off-time signal generator configured to generate said lens shift signal based on the output signals of said first to fourth photodetector segments when said servo controller is in the operation-off state, and an operation-on state signal generator configured to generate said lens shift signal based on the output signals of said first and fourth photodetector segments when said servo controller is in the operation-on state.

6. The recording and/or reproducing for an optical disc according to claim 5, wherein said operation-off time signal generator sums a sample-held peak value of a signal obtained on subtraction between a sum of respective output signals of said first and second photodetector segments and respective output signals of said third and fourth photodetector segments to a sample-held bottom value thereof and averages the sum signals so as to generate said lens shift signal.

7. The recording and/or reproducing for an optical disc according to claim 6, wherein said operation-off time signal generator includes a second adder configured to sum a sum signal of respective output signals of said first and second photodetector segments and a sum signal of respective output signals of said third and fourth photodetector segments, a subtractor configured to subtract output signals of said first and second adders, a peak-holding unit for sample-holding a peak value of the output signals of said subtractor, a bottom-holding unit for sample-holding a bottom value of the output signals of said subtractor, a third adder configured to sum respective output signals of said peak-holding unit and the bottom-holding unit, and an arithmetic unit configured to average output signals of said third adder.

8. The recording and/or reproducing for an optical disc according to claim 5, wherein said operation-on time signal generator performs subtraction between the peak-held signal of the bandpass-limited output signal of said first photodetector and the bottom-held signal of the bandpass-limited output signal of said fourth photodetector, while performing addition between the peak-held subtraction signal and the bottom-held subtraction signal so as to generate said lens-shifting signal.

9. The recording and/or reproducing for an optical disc according to claim 6, wherein said operation-on time signal generator includes a first band-pass filter fed with an output signal of said first photodetector, a first peak-holding unit configured to sample-hold a peak-value of output signals of said first band-pass filter, a second band-pass filter fed with an output signal of said fourth photodetector, a first bottom-holding unit configured to sample-hold a bottom-value of output signals of said second band-pass filter, a subtractor configured to subtract an output of said first peak-holding unit and an output of said first bottom-holding unit, a second bottom-holding unit configured to sample-hold a bottom-value of output signals of said subtractor, and an adder configured to sum respective outputs of said second peak-holding unit and said second bottom-holding unit.

10. The recording and/or reproducing for an optical disc according to claim 2, further comprising:

a controller configured to switch between the lens shift signal from said first signal generating unit and the lens shift signal from said second signal generating unit based on a position of said optical pickup on the optical disc so as to route the selected signal to said controller.

11. The recording and/or reproducing for an optical disc according to claim 10, wherein said controller switches between the lens shift signal from said first signal generating unit and the lens shift signal from said second first signal generating unit based on address information read out by said optical pickup unit.

12. The recording and/or reproducing for an optical disc according to claim 1, further comprising:

a movement mechanism configured to move said optical pickup in the radial direction of said optical disc; and a controller configured to drive said movement mechanism based on the lens shift signal outputted by said shift signal generating unit to move said objective lens towards said neutral position.

13. A recording and/or reproducing apparatus for an optical disc, comprising:
an optical pickup including
a light source configured to illuminate a light beam on an optical disc on which data have been recorded by pits spirally or toroidally, and on which are also recorded address information,
an objective lens configured to converge a light beam radiated from the light source on the optical disc,
a first photodetector configured to receive a converged light beam reflected from said signal surface, said photodetector having first to fourth photodetector segments split by boundary lines running parallel to the tracks of said optical disc, the first to fourth photodetector segments operative to output signals corresponding to the pit area and the grooved area of the optical disk,
a second and third photodetector configured to receive a light reflected from said first photodetector, and
an actuator configured to move said objective lens in a radial direction of said optical disc perpendicular to the optical axis of the objective lens;
an error signal generating unit configured to generate an error signal used to move the objective lens in the radial direction of the optical disc perpendicular to the optical axis of the optical disc, based on the amount of shift in the radial direction of the optical disc of the light bean converged by the objective lens on the signal surface of the optical disc to scan the track on the optical disc, based on the output signals of said first to fourth photodetector segments;
a shift signal generating unit configured to generate a lens shift signal corresponding to the amount of shift from a neutral position of the objective lens, based on the output signals of said first to fourth photodetector segments; and
a servo controller configured to drive said actuator, based on at least one of the lens shift signal generated by said lens shift signal generating circuit and the error signal generated by said error signal generating unit, and to move said objective lens in the radial direction of said optical disc perpendicular to the optical axis of said objective lens.

14. A recording and/or reproducing apparatus for an optical disc 13, wherein said signal generating unit performs subtraction between a sample-held peak value of signals corresponding to the sums of respective output signals of said first and second photodetector segments and a sample-held peak value of signals corresponding to the sums of respective output signals of said third and fourth photodetector segments so as to generate said lens shift signal.

15. The recording and/or reproducing for an optical disc according to claim 14, wherein said first signal generating unit includes
a first adder configured to sum respective output signals of said first and second photodetector segments, a first peak-holding unit configured to hold peak values of the output signals of said first adder,
a second adder configured to sum respective output signals of said third and fourth photodetector segments, a second peak-holding unit configured to hold peak values of the output signals of said second adder, and a subtractor configured to subtract output signals of said first and second peak-holding units.

16. The recording and/or reproducing configured to an optical disc according to claim 14, further comprising:
a controller configured to switch between the lens shift signal from said first signal generating unit and the lens shift signal from said second signal generating unit based on a position of said optical pickup on the optical disc so as to route the selected signal to said controller.

17. The recording and/or reproducing for an optical disc according to claim 16, wherein said controller switches between the lens shift signal from said first signal generating unit and the lens shift signal from said second first signal generating unit based on address information read out by said optical pickup unit.

18. The recording and/or reproducing for an optical disc according to claim 13, further comprising:
a movement mechanism configured to move said optical pickup in the radial direction of said optical disc; and
a controller configured to drive said movement mechanism based on the lens shift signal outputted by said shift signal generating unit to move said objective lens towards said neutral position.

19. A recording and/or reproducing apparatus for an optical disc, comprising:
an optical pickup including
a light source configured to illuminate a light beam on an optical disc on which data have been recorded by pits spirally or toroidally, and on which are also recorded address information,
an objective lens configured to converge a light beam radiated from the light source on the optical disc,
a first photodetector configured to receive a converged light beam reflected from said signal surface, said photodetector having first to fourth photodetector segments split by boundary lines running parallel to the tracks of said optical disc, the first to fourth photodetector segments operative to output signals corresponding to the pit area and the grooved area of the optical disk,
a second and third photodetector configured to receive a light reflected from said first photodetector, and
an actuator configured to move said objective lens in a radial direction of said optical disc perpendicular to the optical axis of the objective lens;
an error signal generating unit configured to generate an error signal used to move the objective lens in the radial direction of the optical disc perpendicular to the optical axis of the optical disc, based on the amount of shift in the radial direction of the optical disc of the light beam converged by the objective lens on the signal surface of the optical disc to scan the track on the optical disc, based on the output signals of said first to fourth photodetector segments;
a shift signal generating unit configured to generate a lens shift signal corresponding to the amount of shift from a neutral position of the objective lens, based on the output signals of said first to fourth photodetector segments;
a servo unit configured to drive said actuator based on at least one of the lens shift signal generated by said shift signal generating unit and the error signal generated by said error signal generating unit, and to move said objective lens along the radial direction of said optical disc perpendicular to the optical axis of the objective lens;

a movement mechanism configured to move said optical pickup along the radial direction of said optical disc; and a controller configured to control the operation of said servo unit and configured to drive said movement mechanism, said movement based on the current position of said objective lens, on the distance to the movement target position of said objective lens, and on the lens shift signal outputted by said shift signal generating unit.

20. The recording and/or reproducing apparatus for an optical disc according to claim 19, wherein said controller finds the amount of the lens shift signal Ls based on the lens shift signal from said shift signal generating unit, and calculates the number of track jumps J based on the current position of the objective lens and on the distance to the movement target position to the objective lens so as to calculate the amount of movement of said optical pickup by said movement mechanism based on the following relationship:

$$S=Ls+J.$$

21. The recording and/or reproducing apparatus for an optical disc according to claim 20, wherein said controller operates said actuator to move said objective lens along the radial direction of the optical disc when the objective lens is moved along the radial direction of the optical disc perpendicular to the optical axis of the objective lens, if the amount of movement S of the optical pickup is smaller than a range of lens shift L which permits recording and/or reproduction.

22. The recording capacity apparatus for an optical disc according to claim 21, wherein said controller drives said movement mechanism based on the amount of movement S of the optical pickup if the amount of movement S of the optical pickup is larger than a range of lens shift L.

23. An accessing method in a recording and/or reproducing apparatus for an optical disc, comprising the steps of:

converging a light beam radiated from a light beam radiated from a light source of an optical pickup by an objective lens on a signal surface of the optical disc having a pit area and a grooved area, on which there are recorded data spirally or toroidally, and on which there are also recorded address information;

receiving a converged light beam, reflected from the signal surface, by a first photodetector having first to fourth photodetector segments split by boundary lines running parallel to the track of said optical disc and by a second and third photodetector;

outputting signals from the first to fourth photodetector segments, said output signals corresponding to the pit area and the grooved area of the optical disk;

generating an error signal used to move said objective lens along the radial direction of said optical disc perpendicular to the optical axis of the objective lens based on an amount of shift along the radial direction of the optical disc of the light beam converged by the objective lens on the signal surface of said optical disc to scan the track of the optical disc, based on the output signals of the first to fourth photodetector segments;

generating a lens shift signal corresponding to the amount of shift from the neutral position of the objective lens based on said output signals of the first to fourth photodetector segments; and moving said objective lens along the radial direction of said optical disc perpendicular to the optical axis of the objective lens based on at least one of the lens shift signal and the error signals generated, while moving said optical pickup along the radial direction of the optical disc perpendicular to the optical axis of the objective lens, said movement based on the current position of the objective lens, on a distance to the movement target position of said objective lens, and on said lens shift signal.

24. The accessing method in a recording and/or reproducing apparatus for an optical disc according to claim 23, wherein the amount of the lens shift signal Ls is found based on the lens shift signal from said shift signal generating unit, and the number of track jumps J is calculated based on the current position of the objective lens and the distance to the movement target position to the objective lens to calculate the amount of movement of said optical pickup by said movement mechanism based on the following relationship:

$$S=Ls+J.$$

25. The accessing method in a recording and/or reproducing apparatus for an optical disc according to claim 24, wherein said optical pickup is moved along the radial direction of the optical disc based on the amount of movement S of the optical pickup if the amount of movement S of the optical pickup is larger than a range of lens shift L.

26. The accessing method in a recording and/or reproducing apparatus for an optical disc according to claim 25, wherein said controller drives said movement mechanism based on the amount of movement S of the optical pickup if the amount of movement S of the optical-pickup is larger than a range of lens shift L.

* * * * *